US012748944B2

(12) United States Patent
Wu et al.

(10) Patent No.: US 12,748,944 B2
(45) Date of Patent: Sep. 29, 2026

(54) SYSTEM AND METHOD FOR MACHINE LEARNING ARCHITECTURE FOR OUT-OF-DISTRIBUTION DATA DETECTION

(71) Applicant: ROYAL BANK OF CANADA, Toronto (CA)

(72) Inventors: Ga Wu, Toronto (CA); Anmol Singh Jawandha, Toronto (CA); Christopher Côté Srinivasa, Toronto (CA)

(73) Assignee: ROYAL BANK OF CANADA, Toronto (CA)

( * ) Notice: Subject to any disclaimer, the term of this patent is extended or adjusted under 35 U.S.C. 154(b) by 1137 days.

(21) Appl. No.: 17/586,410

(22) Filed: Jan. 27, 2022

(65) Prior Publication Data

US 2022/0245422 A1 Aug. 4, 2022

Related U.S. Application Data

(60) Provisional application No. 63/142,201, filed on Jan. 27, 2021.

(51) Int. Cl.
*G06N 3/04* (2023.01)
*G06N 3/088* (2023.01)

(52) U.S. Cl.
CPC ............... *G06N 3/04* (2013.01); *G06N 3/088* (2013.01)

(58) Field of Classification Search
CPC ......... G06N 3/04; G06N 3/045; G06N 3/0455
See application file for complete search history.

(56) References Cited

U.S. PATENT DOCUMENTS

| | | | | |
|---|---|---|---|---|
| 2016/0155136 A1* | 6/2016 | Zhang | G06N 5/045 705/7.29 |
| 2022/0007084 A1* | 1/2022 | Aytekin | H04N 21/845 |
| 2022/0027709 A1* | 1/2022 | Honkala | G06N 3/08 |
| 2022/0036890 A1* | 2/2022 | Yuan | G10L 15/063 |
| 2023/0217028 A1* | 7/2023 | Zhang | H04N 19/30 375/240.02 |
| 2024/0095983 A1* | 3/2024 | Goodwin | G06T 11/60 |

OTHER PUBLICATIONS

Chen et al.; A Simple Framework for Contrastive Learning of Visual Representations; Proceedings of the 37th International Conference on Machine Learning, Vienna, Austria, PMLR 119, 2020; arXiv:2002.05709 dated Jul. 1, 2020.

(Continued)

*Primary Examiner* — Grace Park
(74) *Attorney, Agent, or Firm* — Norton Rose Fulbright Canada LLP

(57) ABSTRACT

Systems and methods for machine learning architecture for out-of-distribution data detection. The system may include a processor and a memory storing processor-executable instructions that may, when executed, configure the processor to: receive an input data set; generate an out-of-distribution prediction based on the input data set and an auto-encoder, the auto-encoder trained based on a pretext task including a transformation of one or more training data sets for reconstruction, the trained auto-encoder trained for reducing a reconstruction error to encode semantic meaning of the training data sets; and generate a signal for providing an indication of whether the input data set is an out-of-distribution data set.

18 Claims, 13 Drawing Sheets

(56) References Cited

OTHER PUBLICATIONS

Choi et al.; WAIC, but Why? Generative Ensembles for Robust Anomaly Detection; arXiv: 1810.01392 dated May 23, 2019.
Daxberger et al.; Bayesian Variational Autoencoders for Unsupervised Out-of-Distribution Detection; arXiv:1912.05651 dated Jul. 15, 2020.
Dinh et al.; Density Estimation Using Real NVP; Published as a conference paper at ICLR 2017; arXiv:1605.08803 dated Feb. 27, 2017.
Dosovitskiy et al.; Discriminative Unsupervised Feature Learning with Exemplar Convolutional Neural Networks; arXiv: 1406.6909 dated Jun. 19, 2015.
Gatys et al.; Image Style Transfer Using Convolutional Neural Networks; 2016 IEEE Conference on Computer Vision and Pattern Recognition (CVPR), 2016, pp. 2414-2423.
Gidaris et al.; Unsupervised Representation Learning by Predicting Image Rotations; Published as a conference paper at ICLR 2018; arXiv:1803.07728 dated Mar. 21, 2018.
Goodfellow et al.; Generative Adversarial Nets; arXiv:1406.2661 dated Jun. 10, 2014.
Hendrycks et al.; A Baseline for Detecting Misclassified and Out-of-Distribution Examples in Neural Networks; Published as a conference paper at ICLR 2017; arXiv:1610.02136 dated Oct. 3, 2018.
Hendrycks et al.; Deep Anomaly Detection with Outlier Exposure; Published as a conference paper at ICLR 2019; arXiv: 1812.04606 dated Jan. 28, 2019.
Huang et al.; Densely Connected Convolutional Networks; arXiv:1608.06993 dated Jan. 28, 2018.
Kingma et al.; Glow: Generative Flow with Invertible 1x1 Convolutions; arXiv:1807.03039 dated Jul. 10, 2018.
Kingma et al.; Auto-Encoding Variational Bayes; arXiv:1312.6114 dated May 1, 2014.
Kodirov et al.; Semantic Autoencoder for Zero-Shot Learning; Proceedings of the IEEE Conference on Computer Vision and Pattern Recognition (CVPR), 2017, pp. 3174-3183.
Lee et al.; A Simple Unified Framework for Detecting Out-of-Distribution Samples and Adversarial Attacks: 32nd Conference on Neural Information Processing Systems (NIPS 2018), Montreal, Canada; arXiv:1807.03888 dated Oct. 27, 2018.
Li et al.; Uncertainty & Robustness in Deep Learning; ICML UDL 2019; Jun. 14, 2019.
Liang et al.; Enhancing the Reliability of Out-of-Distribution Image Detection in Neural Networks; Published as a conference paper at ICLR 2018; arXiv: 1706.02690 dated Aug. 30, 2020.
Ma et al.; Characterizing Adversarial Subspaces Using Local Intrinsic Dimensionality: Published as a conference paper at ICLR 2018; arXiv:1801.02613 dated Mar. 14, 2018.
Misra et al.; Self-Supervised Learning of Pretext-Invariant Representations; Proceedings of the IEEE/CVF Conference on Computer Vision and Pattern Recognition (CVPR), 2020, pp. 6707-6717.
Mohseni et al.; Self-Supervised Learning for Generalizable Out-of-Distribution Detection; The Thirty-Fourth AAAI Conference on Artificial Intelligence (AAAI-20), 2020, pp. 5216-5223.
Nalisnick et al.; Do Deep Generative Models Know What They Don't Know ?; Published as a conference paper at ICLR 2019; arXiv:1810.09136 dated Feb. 24, 2019.
Nalisnick et al.; Detecting Out-of-Distribution Inputs to Deep Generative Models Using Typicality; arXiv:1906.02994 dated Oct. 16, 2019.
Papamakarios et al.; Normalizing Flows for Probabilistic Modeling and Inference; arXiv: 1912.02762 dated Dec. 5, 2019.
Radford et al.; Unsupervised Representation Learning with Deep Convolutional Generative Adversarial Networks: Under review as a conference paper at ICLR 2016—arXiv: 1511.06434 dated Jan. 7, 2016.
Ren et al.; Likelihood Ratios for Out-of-Distribution Detection; 33rd Conference on Neural Information Processing Systems (NeurIPS 2019), Vancouver, Canada; arXiv:1906.02845 dated Dec. 5, 2019.
Rezende et al.; Variational Inference with Normalizing Flows; Proceedings of the 32nd International Conference on Machine Learning, Lille, France, 2015. JMLR: W&CP vol. 37; arXiv:1505.05770 dated Jun. 14, 2016.
Tolstikhin et al.; Wasserstein Auto-Encoders; arXiv:1711.01558 dated Dec. 5, 2019.
Tomczak et al.; VAE with a VampPrior: Proceedings of the 21st International Conference on Artificial Intelligence and Statistics (AISTATS) 2018, Lanzarote, Spain. PMLR: vol. 84.
Vernekar et al.; Analysis of Confident-Classifiers for Out-of-Distribution Detection; Accepted at Safe Machine Learning workshop, ICLR 2019; arXiv:1904.12220 dated Apr. 27, 2019.
Vincent et al.; Extracting and Composing Robust Features with Denoising Autoencoders; Dept. IRO, Universite de Montreal; Technical Report 1316, Feb. 2008.
Yan et al.; Deep Learning; Nature, vol. 521, pp. 436-444, May 28, 2015.
Zhang et al.; Colorful Image Colorization; arXiv:1603.08511 dated Oct. 5, 2016.
Zhang et al.; Split-Brain Autoencoders: Unsupervised Learning by Cross-Channel Prediction; arXiv:1611.09842 dated Apr. 20, 2017.
Bengio et al.; Representation Learning: A Review and New Perspectives; arXiv: 1206.5538 dated Apr. 23, 2014.
Noroozi et al.; Unsupervised Learning of Visual Representations by Solving Jigsaw Puzzles; arXiv:1603.09246 dated Aug. 22, 2017.
Tschannen et al.; Recent Advances in Autoencoder-Based Representation Learning; Third workshop on Bayesian Deep Learning (NeurIPS 2018), Montreal, Canada; arXiv: 1812.05069 dated Dec. 12, 2018.

* cited by examiner

402

404

406

(c) SVHN Inputs (d) SVHN Predictions

SYSTEM AND METHOD FOR MACHINE LEARNING ARCHITECTURE FOR OUT-OF-DISTRIBUTION DATA DETECTION

CROSS REFERENCE TO RELATED APPLICATIONS

This application claims priority from U.S. provisional patent application No. 63/142,201 entitled "SYSTEM AND METHOD FOR MACHINE LEARNING ARCHITECTURE FOR OUT-OF-DISTRIBUTION DATA DETECTION", filed on Jan. 27, 2021, the entire contents of which are hereby incorporated by reference herein.

FIELD

Embodiments of the present disclosure relate to the field of machine learning, and in particular to systems and methods of machine learning architecture for out-of-distribution data set detection.

BACKGROUND

Machine learning systems may be configured to determine whether received input data sets may be unrealistic or have outlier features relative to data sets used during prior machine learning model training. In some examples, machine learning systems may be configured to conduct Out-of-Distribution (OOD) detection for identifying anomalous data sets that may yield non-useful predictions.

SUMMARY

Machine learning architecture for out-of-distribution data set detection are described in the present disclosure. Machine learning architecture may include models for identifying input data sets that may be associated with features that are beyond an expected range (e.g., by a threshold amount). Out-of-distribution data sets may include data values that may be unrealistic or untenable relative to baseline or expected data sets. For instance, image data representing a cat's hind legs may be identified as out-of-distribution relative to image data representing a human face.

In some scenarios, machine learning models for identification of out-of-distribution data sets may be beneficial for pre-empting operations associated with adversarial attacks, thereby leading to unintended alteration of machine learning models.

In some scenarios, machine learning architecture for identification of out-of-distribution data sets may be beneficial for diagnostics operations, such as for evaluating machine learning model failure modes and identifying a degree to which the failure mode may be realistic.

In some scenarios, machine learning architecture for identification of out-of-distribution data sets may be beneficial for identifying possible model drift, in response to training data that may be identified out-of-distribution.

In some scenarios, machine learning architecture for identifying out-of-distribution data sets may be beneficial for operations of generating training data sets for machine learning models by distilling data sets to reduce a quantity of out-of-distribution data sets.

Embodiments of machine learning architecture may be configured for out-of-distribution detection for spatial data sets or sequential data sets. Spatial data sets may be image data having a spatial correlation among respective pixel data values in the data set. Another example of a spatial data set may be a word cloud. In some examples, spatial data sets may be amenable to representation by embeddings. Sequential data sets may be time-series data sets where ordering of data values may be important. For instance, sequential data sets may include data sets representing a deoxyribonucleic acid (DNA) sequence, a word/textual sentence (e.g., for downstream natural language processing operations), performance data for stocks or other financial instruments, among other examples.

The present disclosure describes embodiments of systems and methods of machine learning architecture representing auto-encoders having features for out-of-distribution detection based on input observations in an unsupervised manner. The trained auto-encoders may be based on a Wasserstein Auto-encoder, including features for reducing a reconstruction error for encoding semantic meaning of training data sets and for supporting downstream out-of-distribution scoring operations. As will be described, such embodiment systems may be configured for out-of-distribution detection based on input observations in an unsupervised manner.

In some embodiments, trained Wasserstein Auto-encoders having features described herein may be iteratively refined for increased performance based on few-shot learning operations when OOD data examples may be available. Embodiments of machine learning architecture described herein may exhibit improved out-of-distribution prediction performance, whilst increasing computational efficiency relative to other machine learning architectures for out-of-distribution operations.

In some embodiments, when OOD data set examples may be unavailable, trained Wasserstein Auto-encoders of the present disclosure may identify OOD data points based on proposed normalized mean squared error scoring operations. When a set of OOD examples may be available, trained Wasserstein Auto-encoders may identify OOD data set points based on few-shot learning associated with learned latent representations.

Other features of auto-encoders for out-of-distribution detection will be described in the present disclosure.

In an aspect, the present disclosure describes a system of machine learning architecture for out-of-distribution data set detection. The system may include: a processor; a memory coupled to the processor. The memory may store processor-executable instructions that, when executed, configure the processor to: receive an input data set; generate an out-of-distribution prediction based on the input data set and an auto-encoder, the auto-encoder trained based on a pretext task including a transformation of one or more training data sets for reconstruction, the trained auto-encoder trained for reducing a reconstruction error to encode semantic meaning of the training data sets; and generate a signal for providing an indication of whether the input data set is an out-of-distribution data set.

In another aspect, the present disclosure describes a method of machine learning architecture for out-of-distribution data set detection. The method including: receiving an input data set; generating an out-of-distribution prediction based on the input data set and an auto-encoder, the auto-encoder trained based on a pretext task including a transformation of one or more training data sets for reconstruction, the trained auto-encoder trained for reducing a reconstruction error to encode semantic meaning of the training data sets; and generating a signal for providing an indication of whether the input data set is an out-of-distribution data set.

In another aspect, the present disclosure describes a non-transitory computer-readable medium having stored thereon machine interpretable instructions or data representing an auto-encoder. The auto-encoder trained based on a pretext task including a transformation of one or more training data sets for reconstruction. The trained auto-encoder may be trained for reducing a reconstruction error to encode semantic meaning of the training data sets. The machine interpretable instructions or data which, when executed by a processor, cause the processor to perform a computer implemented method including: receiving an input data set; generating an out-of-distribution prediction based on the input data set and the trained auto-encoder; and generate a signal for providing an indication of whether the input data set is an out-of-distribution data set.

In another aspect, a non-transitory computer-readable medium or media having stored thereon machine interpretable instructions which, when executed by a processor may cause the processor to perform one or more methods described herein.

In various further aspects, the disclosure provides corresponding systems and devices, and logic structures such as machine-executable coded instruction sets for implementing such systems, devices, and methods.

In this respect, before explaining at least one embodiment in detail, it is to be understood that the embodiments are not limited in application to the details of construction and to the arrangements of the components set forth in the following description or illustrated in the drawings. Also, it is to be understood that the phraseology and terminology employed herein are for the purpose of description and should not be regarded as limiting.

Many further features and combinations thereof concerning embodiments described herein will appear to those skilled in the art following a reading of the present disclosure.

DESCRIPTION OF THE FIGURES

In the figures, embodiments are illustrated by way of example. It is to be expressly understood that the description and figures are only for the purpose of illustration and as an aid to understanding.

Embodiments will now be described, by way of example only, with reference to the attached figures, wherein in the figures.

DETAILED DESCRIPTION

Figure 1:
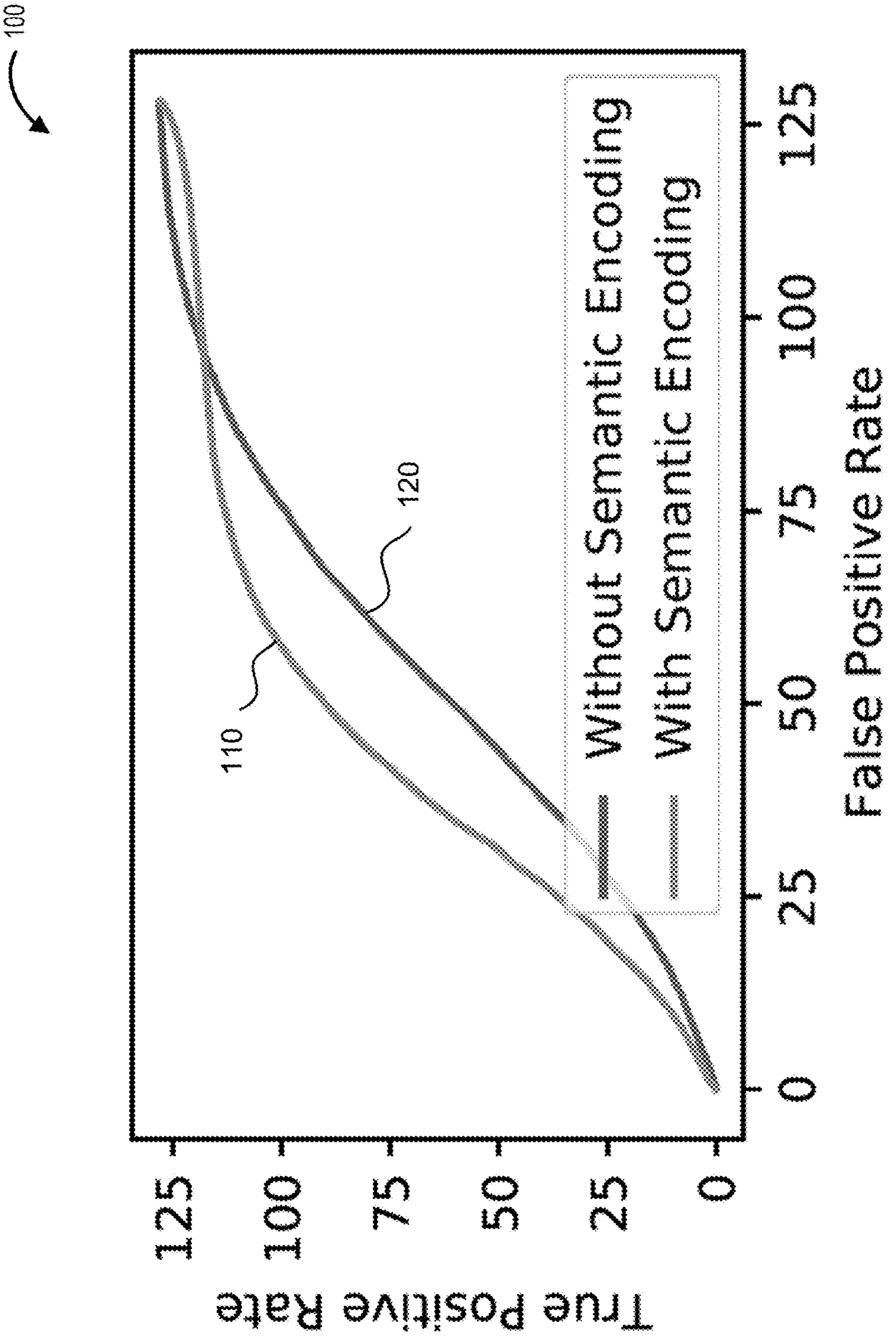
FIG. 1 is a chart illustrating an OOD detection performance comparison among an auto-encoder with and without semantic encoding operations, in accordance with embodiments of the present disclosure.

The present disclosure describes systems and methods for machine learning architecture for out-of-distribution data set detection. Some embodiments disclosed herein may be configured for identifying or countering adversarial data sets or non-realistic data sets. In some examples, systems may be an auto-encoder trained based on one or a combination of pretext tasks including a transformation of training data sets for reconstruction. The auto-encoder may be trained for reducing a reconstruction error to encode semantic meaning of training data sets. In some embodiments, trained auto-encoders may be configured based on generated fingerprints.

In some embodiments, operations for capturing semantic meaning of data sets and operations for out-of-distribution data detection may be configured modularly. Further, operations for out-of-distribution data detection may be based on one or more scoring functions. For example, the type of scoring functions may be based on whether out-of-distribution data may be available. In some embodiments, where OOD data may be unavailable, OOD detection may be based on a normalized mean squared error as a confidence score. Where a small number of OOD data points may be available, OOD detection may be based on few-shot supervised learning to classify testing data sets.

In some embodiments, the machine learning architecture for out-of-distribution data detection may be configured to validate or refine machine learning models using data associated with failure modes. The machine learning architecture for out-of-distribution data detection may be configured to provide an indication of adversarial robustness, fairness, data drift, or other machine learning model properties over time. For example, results of an out-of-distribution detection may identify data sets having failing data points and determine a subset of the failing data points for retraining a machine learning model, thereby increasing machine learning reliability.

In some embodiments, an auto-encoder model may be provided for conducting OOD detection based on a customized or configured Wasserstein Auto-encoder for capturing in-distribution observations' semantic meaning based on pretext tasks. In this way, operations may be conducted for OOD detection without reliance on in-distribution data labels. In some scenarios, the OOD detection may be conducted based on forward propagation. In some embodiments, operations may be conducted based on few-shot learning when OOD data may be available.

Embodiments of the present disclosure may include operations that may leverage one or more pretext task operations for determining meaning of data set observations. For example, a pretext task operation may randomly rotate input observations and may determine a prediction and reconstruction of the input data set with corrected orientation. In some embodiments, the auto-encoder model may be configured to determine objects in data set inputs and capture details or properties of the objects as a basis for data set reconstruction.

Features of embodiment systems and methods of machine learning architecture for out-of-distribution detection will be described herein.

In some examples, density estimation based Out-of-Distribution (OOD) detection approaches may adopt multiple models or a complex model for providing out-of-distribution detection. Such example approaches may include operations that require considerable computation power to generate data set inferences, which may be undesirable for computing devices having finite computing resources.

In some embodiments described in the present disclosure, an Auto-encoder based approach to conduct OOD detection may be described. As an example, a Wasserstein Auto-encoder model may capture in-distribution observations' semantic meaning through pretext tasks. Based on such embodiments, OOD detection operations may be conducted without in-distribution data labels; inference may be a simple forward propagation; and example operations disclosed herein may provide improved performance with few-shot learning when OOD examples are available.

In some examples, machine learning architecture for identifying valid input distribution may be configured to reject high-risk inputs that potentially raise catastrophic consequences [Dietterich Gilmer (2019)]. While some example classification confidence score based Out-of-Distribution (OOD) detection approaches may demonstrate desirable performance on benchmark datasets, deployment on real-world tasks may be limited because such approaches may be based on 1) class labels for in-distribution data are available for representation learning [Hendrycks Gimpel (2016), Liang et al. (2017)] or 2) a reasonable amount of OOD examples are accessible [Hendrycks et al. (2018)].

In some scenarios, deep generative models may be provided because they conduct OOD detection based on capturing the distribution of in-distribution inputs. These example attempts show sub-optimal performance as the density estimation ability of the generative models that may not be optimal [Nalisnick et al. (2018)]. To improve the reliability of the density estimation, in some examples, multiple density estimators to reduce the noise and variance may be introduced in the individual models [Choi et al. (2018), Daxberger Hern dez-Lobato (2019), Ren et al. (2019)].

In some examples [Nalisnick et al. (2019), embodiments may include operations to adapt Auto-regressive network and Normalizing Flows [Rezende Mohamed (2015), Dinh et al. (2016), Kingma Dhariwal (2018)] for providing an unbiased density estimation. This may yield performance improvements over the other example types of generative models, such as Variational Auto-encoders (VAE) [Kingma Welling (2013)] and Generative Adversarial Networks (GAN) [Goodfellow et al. (2014)].

Despite favourable distribution modelling ability, existing generative model-based detection methods may require larger computation power to obtain a reliable performance. Such a requirement may not be desirable for device-level tasks. Even with an example Normalizing Flow model, having to compute the log determinant forces the approach to maintain a large computation graph proportional in size to the number of input dimensions [Papamakarios et al. (2019)]. In some scenarios, the approach may require one or more layers to obtain enough flexibility to capture nonlinear transformations.

Embodiments of the present disclosure provide an Auto-encoder based approach to conduct OOD detection while reducing performance reductions. In some examples, many efforts have been made to adapt Auto-encoders to perform OOD detection. However, their performance may be unsatisfiable due to falsely assigning high-density scores to OOD inputs [Nalisnick et al. (2018)]. While some examples [Nalisnick et al. (2019)] may attribute such poor performance to the mismatching between high density and typical set, embodiments disclosed herein may show that failing to capture the semantic meaning of inputs may cause undesirable performance. Specifically, reconstructing compressed observations may not correspond to encoding semantic meaning, even though the latent representation is regularized into a manageable distribution.

In some embodiments, systems and methods of machine learning architecture may include a Calibrated Wasserstein Auto-encoder having a pretext task for identifying or encoding semantic meaning of observed data sets. For instance, operations for conducting a pretext task may randomly rotate input data sets and configure the auto-encoder to predict and reconstruct the inputs with corrected orientation. In some embodiments, operations of the auto-encoder may be configured to identify the objects in the inputs and capture detailed properties of the objects needed for reconstruction. To conduct OOD detection on the proposed CWAE model, embodiments disclosed herein may include: 1) when no OOD data is accessible, operations to include normalized mean squared error as confidence score for OOD detection; and 2) when small number of OOD data is available, operations to include few-shot supervised learning to classify inputs directly may be provided.

In some examples provided herein, embodiments may be tested against three groups of benchmark datasets and may be compared over 12 existing OOD detection approaches. In some scenarios, embodiments disclosed herein may be competitive with other example OOD detection operations and approaches. In some scenarios, embodiments provided herein (e.g., before providing any OOD example) may outperform semi-supervised models with a relatively large performance difference.

Examples of machine learning architecture for out-of-distribution data set detection may be based on one or more scenarios associated with data sets: supervised, unsupervised with data sets having in-distribution labels, and unsupervised with data sets without in-distribution labels.

In some scenarios, a supervised approach may be based on observations from both in-distribution and out-distribution data and may be based on training classifiers to directly classify input observations. For example, a Mahalanobis-based detector-based architecture [Lee et al. (2018)] may be configured to aggregate feature maps from multiple layers of a pre-trained model to construct data to train a binary classifier for OOD detection. In another example, a Local Intrinsic Dimensionality (LID)-based detector architecture [Ma et al. (2018)] may be configured based on LID information to train a data set classifier. In other examples, Outlier Exposure-based architecture [Hendrycks et al. (2018), Mohseni et al. (2020)] may include operations configured to maximize a prediction confidence for in-distribution data while minimizing it for OOD examples.

In some scenarios, an unsupervised approach with in-distribution labels may be based on in-distribution data and may be based on available meaningful classification labels. Unsupervised architectures for OOD may include operations to train a classifier solely to classify in-distribution data into its corresponding labels and may detect OOD inputs by evaluating the classifiers' confidence score of prediction. The MaxSoftmax [Hendrycks Gimpel (2016)] architecture may be an example of an unsupervised approach to OOD. ODIN [Liang et al. (2017)] may be a refinement of the MaxSoftmax architecture, and may be configured to tune Temperature Scaling and performing Input Preprocessing.

In some scenarios, an unsupervised approach without in-distribution labels may require neither OOD examples nor in-distribution data labels. Such architectures may be configured to capture in-distribution data distribution through deep generative models and may estimate the density of input observations to identify OOD points. For example, a Likelihood Ratio approach [Ren et al. (2019)] may maintain two deep generative models (one ordinary and one background model) and may predict by contrasting density predictions between the two models. A BVAE architecture [Daxberger Hem dez-Lobato (2019)] and WAIC [Choi et al. (2018)] generalized such an idea by jointly considering the expectation and variance of density estimation from multiple models.

A Typicality-based OOD architecture model [Nalisnick et al. (2019)] may be configured to utilize a single model to make the prediction. To obtain a reliable OOD detection performance, existing unsupervised approaches may need to be implemented in combination with complex deep generative models such as Glow [Kingma Dhariwal (2018)] to maintain its performance by successfully capturing the in-distribution data distribution. Embodiments of systems and methods described in the present disclosure may remedy above described disadvantages.

Capturing a meaningful representation of input data set values or observations without supervision may be a challenging technical problem [Bengio et al. (2013)]. Some example reconstruction-based approaches may be suboptimal for such a task as they may converge to trivial solutions that learn data compression [Tschannen et al. (2018)]. Some example unsupervised representation learning shows that introducing a pretext task may address the issue by exploiting the known invariant of distortion. In particular, a pretext task operation may be configured to transform an unsupervised learning task into a self-supervised task by introducing labels from data distortion solely for image representation learning tasks. Examples of architectures including pretext task operation approaches are described below.

Embodiments of an Exemplar-CNN architecture [Dosovitskiy et al. (2015)] may create a surrogate training dataset with unlabeled image patches. The corresponding pretext task may be to predict the relative position between two patches on the same image. Further extensions of this architecture may incorporate further patches and complex pretext tasks such as jigsaw puzzle prediction [Noroozi Favaro (2016)], which may further improve its representation learning performance.

Embodiments of Colorization architecture [Zhang et al. (2016)] may introduce a pretext task that predicts colour channels given grayscale input image. To optimally assign colours to objects in an image, the model may capture the basic concept of objects shown in images. For example, human skin is unlikely to be green.

Embodiments of Denoising & Corruption architecture may include operations including group of pretext tasks that work on Auto-encoders where random or structured denoising or corruptions are introduced to encourage generalization. For example, a Denoise Auto-encoder [Vincent et al. (2008)] may be configured to randomly ignore some of the inputs features and may require the model to recover the image's corrupted portion. Further extensions may focus on a more structured prediction problem. For example, embodiments of a Split-brain Auto-encoder [Zhang et al. (2017)] may include operations to split inputs into two feature groups and may require the model to predict a group given another one.

Embodiments of a Rotation-based architecture [Gidaris et al. (2018)] may include operations to randomly rotate images and may train a classifier to identify the degree of rotation. Some embodiments of the present disclosure may be an extension of the rotation operations and methods.

In some embodiments, a Wasserstein Auto-encoder may be configured. A Wasserstein Auto-encoder (WAE) may be an auto-encoder based generative model, where latent representations may be regularized by minimizing a Wasserstein distance between an encoded latent distribution and a pre-defined prior distribution. Given training data set X={ . . . $(x_i)$ . . . }, an objective function of WAE may be factorized into two components as follows:

$$\frac{1}{M}\sum_{i=1}^{M}\underbrace{\mathcal{L}(x_i, f_\vartheta(f_\theta(x_i)))}_{ReconstructionLoss} + \underbrace{\mathcal{D}(f_\theta(X), \mathcal{N}(0, I))}_{LatentRegularization}$$

where $f_\theta$ and $f_\vartheta$ denotes encoder and decoder respectively, M represents number of training points, and the latent regularization term $\mathcal{D}$ is the Wasserstein distance. The reconstruction loss may be Mean Squared Error (MSE). While the loss function of a WAE may appear to be similar to the objective of Variational Auto-encoders, the WAE may not have a probabilistic graphical model interpretation in terms of optimizing the Evidence Lower-bound Objective (ELBO). The Wasserstein Auto-encoder may be associated with flexibility such as the arbitrary shape of the prior distribution of latent representations and may remove the cumbersome latent sampling step during training/inference.

In some embodiments, operations of an OOD detection model may include two components: an auxiliary model $f_\theta(x)$ and a scoring function $\mathcal{S}(f_\theta, x_{test})$. The Auxiliary model may be configured to capture knowledge of the training data $X_{train}$ based on various types of machine learning models $f_w$, whereas the scoring function may analyze captured knowledge from trained models to generate an out-of-detection prediction for respective testing data points $x_{test}$.

For illustration, some examples described in the present disclosure may be directed to image OOD detection. It may be understood that other types of testing data sets including data sets representing spatial data or time-series/sequential data may be used.

In some embodiments, machine learning architecture include models for identifying semantic meaning of in-distribution observations through customizations of Wasserstein Auto-encoders (an auxiliary model). The machine learning architecture may also include operations for OOD detection in combination with trained model based on forward propagation (one or more scoring functions). In scenarios where OOD data sets may be available, the machine learning architecture may include operations directed to few-shot learning to maximize OOD detection performance.

Machine learning architecture including operations for determining the semantic meaning of in-distribution observations may be beneficial for unsupervised OOD detection. FIG. 1 is a chart 100 illustrating an OOD detection performance comparison among auto-encoders with semantic encoding 110 and without semantic encoding 120 operations, in accordance with embodiments of the present disclosure. In FIG. 1, in-distribution data may include a Cifar-10 data set, and out-distribution data may include a SVHN data set. The example detector may be a simple Mean Squared Error between the original inputs and reconstructed inputs through Auto-encoders.

In FIG. 1, a comparison of the OOD detection performance of a MaxSoftmax model based on two trained auto-encoder models is shown. While both auto-encoders may have substantially similar network architecture and similar reconstruction ability, the OOD detection performance may be different. When the latent representation of auto-encoder captures the semantic meaning, it demonstrates better support to the OOD detection task.

Figure 2:
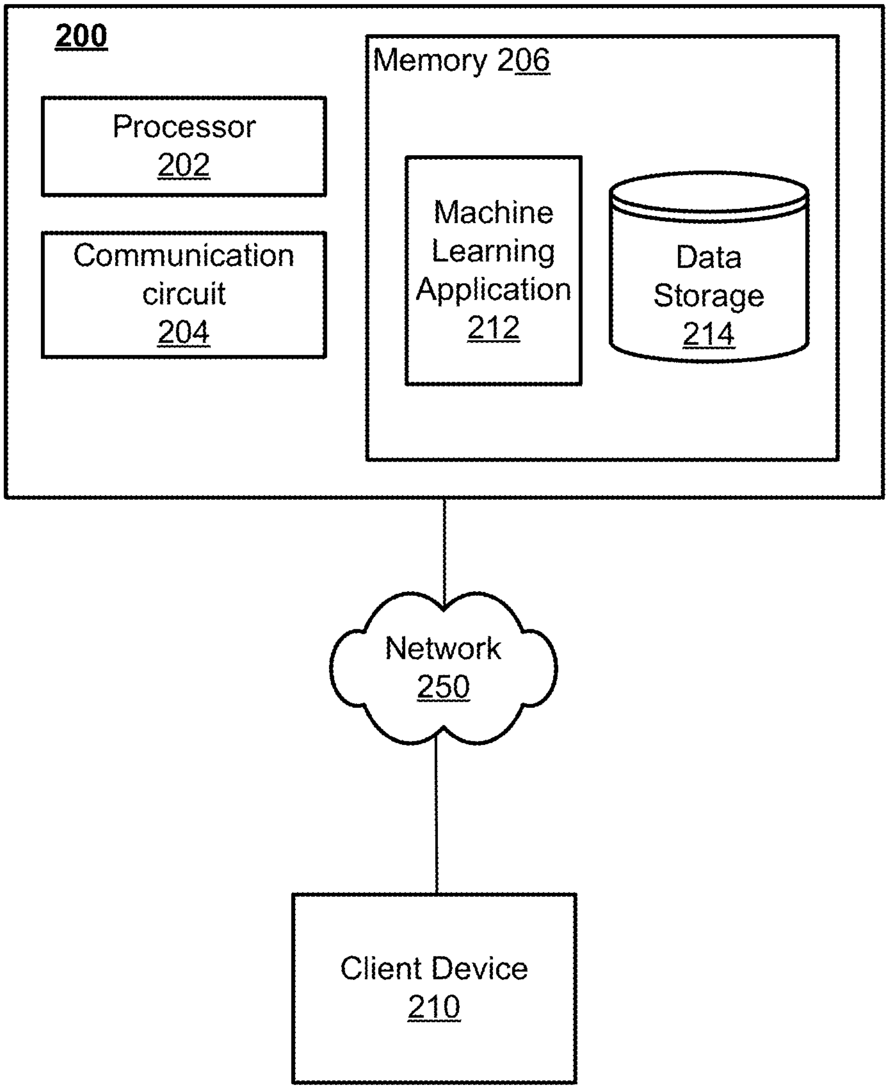
FIG. 2 illustrates a system for machine learning architecture, in accordance with embodiments of the present disclosure.

Reference is made to FIG. 2, which illustrates a system 200 of machine learning architecture, in accordance with an embodiment of the present disclosure. The system 200 may transmit and/or receive data messages to/from a client device 210 via a network 250. The network 250 may include a wired or wireless wide area network (WAN), local area network (LAN), or a combination thereof.

The system 200 includes a processor 202 configured to execute processor-readable instructions that, when executed, configure the processor 202 to conduct operations described herein. For example, the system 200 may be configured to conduct operations for out-of-distribution data set detection.

The processor 202 may be a microprocessor or microcontroller, a digital signal processing (DSP) processor, an integrated circuit, a field programmable gate array (FPGA), a reconfigurable processor, a programmable read-only memory (PROM), or combinations thereof.

The system 200 includes a communication circuit 204 to communicate with other computing devices, to access or connect to network resources, or to perform other computing applications by connecting to a network (or multiple networks) capable of carrying data. In some embodiments, the network 250 may include the Internet, Ethernet, plain old telephone service line, public switch telephone network, integrated services digital network, digital subscriber line, coaxial cable, fiber optics, satellite, mobile, wireless, SS7 signaling network, fixed line, local area network, wide area network, and others, including combination of these. In some examples, the communication circuit 204 may include one or more busses, interconnects, wires, circuits, and/or any other connection and/or control circuit, or combination thereof. The communication circuit 204 may provide an interface for communicating data between components of a single device or circuit.

The system may include memory 206. The memory 206 may include one or a combination of computer memory, such as static random-access memory, random-access memory, read-only memory, electro-optical memory, magneto-optical memory, erasable programmable read-only memory, electrically-erasable programmable read-only memory, Ferroelectric RAM or the like.

The memory 206 may store a machine learning application 212 including processor readable instructions for conducting operations of one or more models described herein. In some embodiments, the machine learning application 212 may include operations for out-of-distribution data set detection. In some embodiments, the machine learning application 212 may include operations for training a customized Wasserstein Auto-encoder. Other example operations may be contemplated and are described in the present disclosure.

The system 200 may include a data storage 214. In some embodiments, the data storage 214 may be a secure data store. In some embodiments, the data storage 214 may store input data sets, such as image data, training data sets, or the like.

The client device 210 may be a computing device including a processor, memory, and a communication interface. In some embodiments, the client device 210 may be a computing device associated with a local area network. The client device 210 may be connected to the local area network and may transmit one or more data sets, via the network 250, to the system 200. The one or more data sets may be input data, such that the system 200 may determine whether the input data is valid or in-distribution input, and may determine data input that may be out-of-distribution and unsuitable for machine learning model training. Other operations may be contemplated, as described in the present disclosure.

For ease of exposition and for illustration, embodiments of the present disclosure may be described with reference to pretext tasks that include rotation transformation operations. It may be understood that other pretext task types may be used for transforming spatial data sets or sequential (e.g., time-series) data sets for training embodiments of machine learning models described in the present application.

In some embodiments, to capture the semantic meaning of in-distribution observations, systems may train a Auto-encoder architecture to estimate the geometric transformation applied to an input image. For example, given a set of random transformation functions $\Phi(\bullet)=\{\phi_k(\bullet)|\in\{1 \ldots K\}\}$ that transform input x into superficially different observations but preserve semantic meaning, in some embodiments, systems may be configured minimize a reconstruction error of the Auto-encoder such that:

$$\mathcal{L}(X) = \frac{1}{M}\frac{1}{K}\sum_{i}^{M}\sum_{k}^{K}\mathcal{L}(x_i, f_\vartheta(f_\theta(\phi_k(x_i)))),$$

where $f_\theta$ and $f_\vartheta$ denote encoder and decoder networks respectively.

In another example, the objective function may be represented as:

$$\mathcal{L}_1(X) = \frac{1}{M}\frac{1}{K}\sum_{i}^{M}\sum_{k}^{K}\|X_i - f_\vartheta(f_\theta(\phi_k(x_i)))\|^2,$$

where $f_\theta$ and $f_\vartheta$ denote encoder and decoder networks respectively.

In some embodiments, such objective functions may be an example of a many-to-one mapping task, where the random transformation functions $\phi$ may be cancelled by the auto-encoder network. That is, to revoke effects of one or more random transformations, the auto-encoder may learn to encode invariant information (or knowledge) of the input data sets.

In some embodiments, among multiple transformation options, systems may conduct operations based on rotation transformations. Compared to other types of example transformations, in some scenarios, operations including the rotation transformation may remove unnecessary constraints used to prevent trivial solutions. For example, Exemplar-CNN may need to incorporate constraints to mitigate chromatic aberration. Although incorporating such constraints for a classification based pretext task may be effortless, this may raise intractable bias when the objective is to reconstruct original input observation.

Embodiments of machine learning architecture for training models that are described in the present disclosure may include one or more beneficial features: 1) by encouraging reconstruction of original input observations, a latent representation may capture detailed property of objects in inputs, which may be more informative than representation predicting orientation alone; and 2) multi-objective pretext task may construct mutual regularization to the latent representation that may further reduce the risk of over-fitting (to the trivial pretext task).

In some scenarios, a generalization ability of a latent representation may be useful for supporting few-shot learning OOD detection described in the present disclosure. In some embodiments, machine learning architecture may include customizations for improving data set generalization ability.

In some embodiments, systems may include the encoder portion of the Auto-encoder for capturing the semantic meaning (and details) of observations along. In some embodiments, systems may include the decoder portion for reconstructing original inputs based on the encoded information. Without regularization, embodiments of the encoder and decoder would participate in the encoding process, making the latent representation extracted from the encoder less informative.

It may be beneficial to reduce expressive ability of a decoder by removing all global transformations (e.g., fully connected layers). Thus, in some embodiments, systems and methods may include asymmetric auto-encoder architecture.

Figure 3:
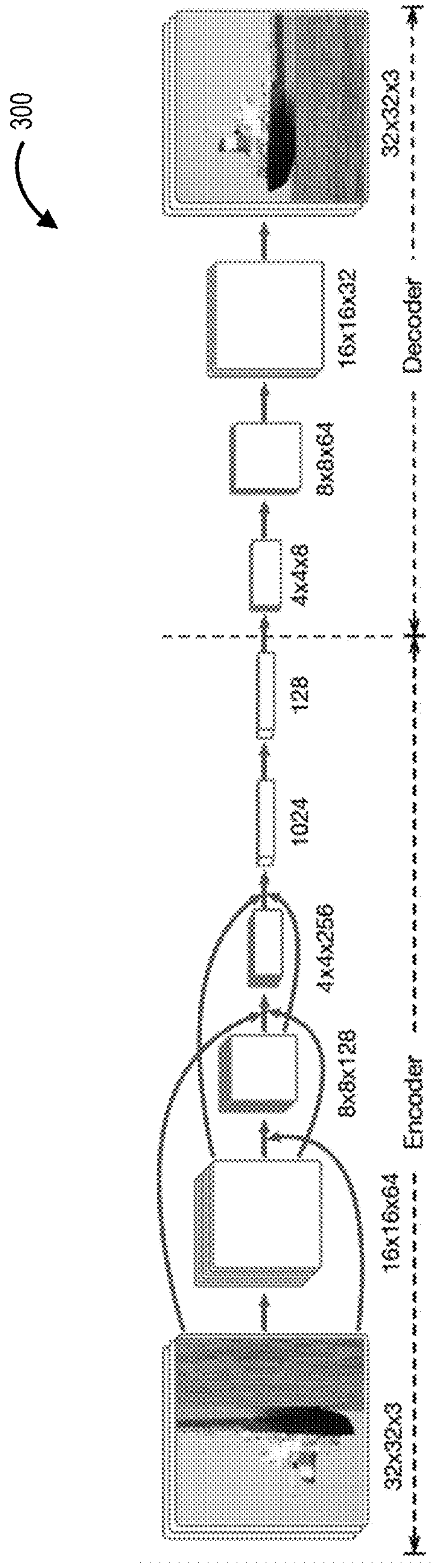
FIG. 3 illustrates an auto-encoder architecture of a pretext task, in accordance with embodiments of the present disclosure.

Reference is made to FIG. 3, which illustrates architecture of an Auto-encoder 300 including one or more pretext task operations, in accordance with embodiments of the present disclosure. The encoder may be densely connected with extended number of feature maps and may fully connect layers. The decoder may include simple transposed convolution stacks with reduced number of feature maps.

In some embodiments, the decoder's expressive ability may be reduced based on operations for removing global transformation (fully connected layers). In some embodiments, the encoder network may be configured as a complex DenseNet architecture [Huang et al. (2017)] that maximizes operations to encode global information.

To improve the generalization ability of the asymmetric auto-encoder architecture, in some embodiments, systems may be configured to regularize the latent representation distribution such that encoded representation may be in valid domain of decoder function. For example, systems may be configured to minimize Wasserstein distance between encoded representations with prior distribution p(Z) such that $$\mathcal{D}(f_\theta(X), p(Z)) = inf_{\gamma\in\Pi(f_\theta(X),p(Z))}E_{(z',z)\sim\gamma}[\|z'-z\|].$$

In some scenarios, regularization may be achieved through GAN style min-max optimization [Tolstikhin et al. (2017)].

While examples of Variational Auto-encoders may regularize the latent representation by minimizing the KL divergence between each encoded representation and the prior distribution, such examples may exhibit occasional training failures such as mode-collapse or numeric issue. While GAN training may also encounter mode collapse problems, in some scenarios, the usage of GAN training may serve as latent regularization operations without reconstruction loss. Such example instability of training may be due to the many-to-one mapping described herein.

In some embodiments, inefficiencies of element-wise reconstruction loss for auto-encoder models may include suboptimal operations to identify structural or spatial correlation among observed data values (e.g., structural or spatial correlation among a plurality of pixel data for a data set representing an image). As such, reconstructed image data may be blurry or inconsistent, which may impact the OOD detection performance when evaluating data set reconstruction quality as a scoring function. It may be beneficial to provide machine learning architecture for learning structural or spatial correlation among observed data sets based on operations for enforcing style consistency.

To preserve the correlation of features in observed data inputs (e.g., pixel data correlation for data sets representing images), in some embodiments, systems may include operations to adapt a Gram matrix of an observation space to capture correlation between raw input elements. Formally, style encoding of an observation $x_i$ may be expressed as an outer product of the same vector:

$$\mathcal{G}(x_i) = \psi(x_i)\psi(x_i)^T$$

where $\psi$ is the base function described in the present disclosure.

The style objective may be a MSE loss function in combination with the Gram matrix to penalize an image style shift after a prediction, such that $$\mathcal{L}(X) = \frac{1}{M}\frac{1}{K}\sum_i^M\sum_k^K \mathcal{L}(\mathcal{G}(x_i), \mathcal{G}(\hat{x}_{i,k})),$$

where $\hat{x}_{i,k}=f_\vartheta(f_\theta(\phi_k(x)))$ denotes reconstructed and re-orientated observation.

In some embodiments, the style objective may be expressed as:

$$\mathcal{L}_2(X) = \frac{1}{M}\frac{1}{K}\sum_i^M\sum_k^K \|\mathcal{G}(x_i) - \mathcal{G}(\hat{x}_{i,k})\|^2,$$

where $\hat{x}_{i,k}=f_\vartheta(f_\theta(\phi_k(x)))$ denotes the reconstructed and reoriented observation.

A sub-optimal feature of the above description includes dimensionality. A square of an observation dimension could be up to 150,994,933 for a small image patch with dimension (64,64,3), which may be computationally intensive operations for an OOD detector. To reduce the sub-optimality of the foregoing, in some embodiments, systems may conduct operations of a base function $\psi$, which may be a pooling function for reducing an observation dimension to a lesser magnitude, such as (14,14,3).

In some scenarios, it may be beneficial to provide machine learning architecture configured to enforce latent representations associated with Auto-encoders to be discrete. Such operations may categorize a pattern of latent representations and may be configured identify the different types of OODs. In some embodiments, the Wasserstein Auto-encoder architecture disclosed herein may include operations for customizing the prior distribution.

In some embodiments, operations for obtaining binary latent representation encoding may be associated with one or properties of momentum-based optimizer and simple gradient descent. For example, an objective function may be:

$$\mathcal{J}(Z, d) = \frac{1}{M}\sum_{i}^{M}\left(d - \sqrt{\sum_{j}^{N}(z_{ij}^{2})}\right)^{2},$$

where initial $z_i \sim \mathcal{N}(0, I)$, d denotes ideal distance to the origin (as a hyper-parameter), and N denotes dimension of vector $z_i$.

Figure 4A:
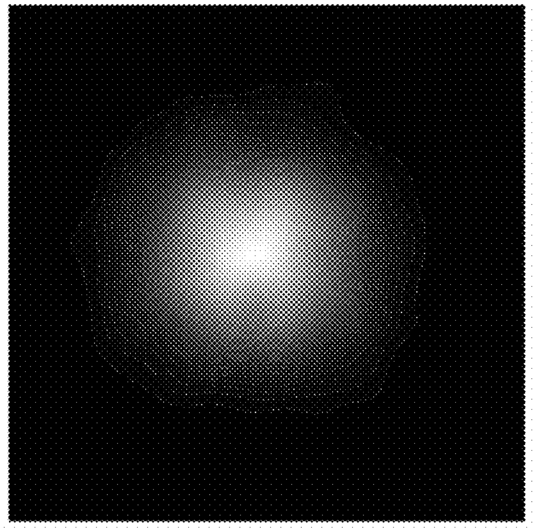
FIGS. 4A, 4B, and 4C illustrate customized prior distributions based on gradient descent, in accordance with embodiments of the present disclosure.
Figure 4B:
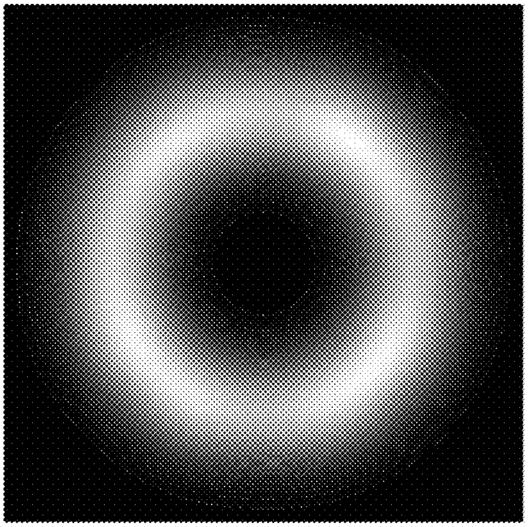
Figure 4C:
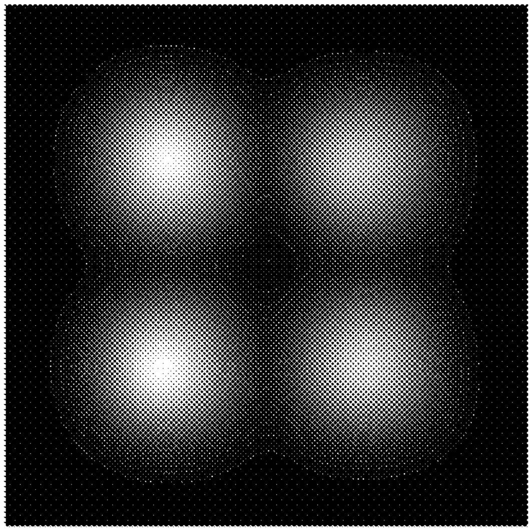

To illustrate, reference is made to FIGS. 4A, 4B, and 4C, which illustrate customized prior distributions based on gradient descent, in accordance with embodiments of the present disclosure.

FIG. 4A illustrates latent representations 402 sampled from Gaussian distribution. FIG. 4B illustrates transformed latent distribution 404 by optimizing the objective function $\mathcal{J}$ (Z,d) described above. FIG. 4C illustrates transformed latent distribution 406 by optimizing said objective function based on an Adam optimizer.

In some embodiments, by optimizing the above-described objective with respect to latent representation Z, the latent representation distribution P(Z) may be transformed into a ring shape distribution, as shown in FIG. 4B. In some embodiments, when optimizing the objective through operations of a momentum-based optimizer, such as an Adam optimizer, the latent representation distribution may converge into a discrete binary distribution, as shown in FIG. 4C.

As an illustrating example, pseudocode for training a calibrated Wasserstein Auto-encoder may be as follows:

Algorithm 1 Training Calibrated Wasserstein Auto-encoder

Require: initialized parameters of the encoder θ, decoder ϑ, and discriminator η.
  while (θ, ϑ, η) not converved do
    Sample $\{x_1, \ldots, x_M\}$ from the training set
    for each sample $x_i$ do
      Randomly sample transformation $k \in 1, \ldots, K$
      $\hat{z}_i = f_\theta(\phi_k(x_i))$
    end for
    Sample $Z = \{z_1, \ldots, z_M\}$ from Gaussian
    for Small number of iterations do
      $Z = Z + \frac{\partial \mathcal{J}(Z, d)}{\partial Z}$
    end for
    Update discriminator $f_\eta$ by ascending:
      $\frac{1}{M}\sum_{i=1}^{M} f_\eta(z_i) - f_\eta(\hat{z}_i)$
    Update encoder $f_\theta$ and decoder $f_\vartheta$ by descending:
    $\frac{1}{M}\sum_{i=1}^{M} \mathcal{L}(x_i, f_\vartheta(\hat{z}_i)) + \mathcal{L}(\mathcal{G}(x_i), \mathcal{G}(f_\vartheta(\hat{z}_i))) - f_\eta(\hat{z}_i)$
  end while The example illustrated in the above pseudocode includes operations for creating a fingerprint based on latent representations sampled from a Gaussian distribution.

In some embodiments, training a Wasserstein Auto-encoder based on machine learning architecture features described in the present disclosure may be as follows:

Require: Initialized parameters of the encoder θ, decoder ϑ, and discriminator η.
  while (θ, ϑ, η) not converged do
    Sample $\{x_1, \ldots, x_M\}$ from the training set
    for each sample $x_i$ do
      Randomly sample transformation $k \in 1, \ldots, K$
      $\hat{z}_i = f_\theta(\phi_k(x_i))$
    end for
    Update discriminator $f_\theta$ by ascending:
      $\frac{1}{M}\sum_{i=1}^{M} f_\eta(z_i) - f_\eta(\hat{z}_i)$
    Update encoder $f_\theta$ and decoder $f_\vartheta$ by descending:
      $\frac{1}{M}\sum_{i=1}^{M}\left[\|x_i - f_\vartheta(\hat{z}_i)\|^2 + \|\mathcal{G}(x_i), \mathcal{G}(f_\vartheta(\hat{z}_i))\|^2 - f_\eta(\hat{z}_i)\right]$
end while One or a combination of embodiments of the machine learning architecture features described above may provide systems for training an Auto-encoder as an auxiliary model for conducting out-of-distribution data set detection. In some embodiments, such Auto-encoders may be based on a Wasserstein Auto-encoder.

Embodiments of systems and methods may be provided to generate out-of-distribution data set prediction based on auxiliary models (e.g., Auto-encoders having embodiments of features described in the present disclosure) in combination with embodiments of scoring operations.

In some scenarios, given an input observation from an in-distribution data set, a trained Auto-encoder model may re-orient and reconstruct an input data set. In contrast, if the trained Auto-encoder model may be unable to recognize the input data set, a predicted orientation of the data set (e.g., image data set) may be random and a reconstructed data set may not accurately capture features of the input data set.

In some embodiments, a machine learning architecture may be based on a scoring function provided as:

$$\mathcal{S}(x_i) = 1 - \frac{\|x_i - \hat{x}_i\|^2}{\sum_{k'}^{K}\|x_i - \phi_{k'}(\hat{x}_i)\|^2},$$

where $\hat{x}_i = f_\vartheta(f_\theta(x))$ denotes a predicted reconstruction. The above example scoring function may be referred to herein as a "simplified" scoring function. Embodiments of the scoring function may generate a probability (value in range of [0,1]) as an in-distribution score. A relatively larger probability value may indicate that observed input data may be in-distribution data. The numerator portion $\|x_i - \hat{x}_i\|^2$ of the scoring function may illustrate a magnitude of error associated with the reconstruction when the orientation prediction is correct. The denominator portion of the scoring function may be a partition function that the probability value is within the range [0,1]. Since a mean-squared error may be unbounded, it may be beneficial to avoid solely utilizing the above-described numerator portion as a scoring function.

In some scenarios, the above described scoring function may not be optimal where OOD data values may be inadvertently or incorrectly predicted to be correctly oriented. Such a scenario may result in low precision during OOD detection operations. Accordingly, in some embodiments, a scoring function may be based on features of ensemble models. To illustrate, a scoring function having an outer loop of geometric transformations may be provided as:

$$\mathcal{S}(x_i) = \frac{1}{K}\sum_k^K \left[1 - \frac{\|\phi_k(x_i), \phi_k(\hat{x}_i)\|^2}{\sum_{k'}^K \|\phi_k(x_i), \phi_{k'}(\hat{x}_i)\|^2}\right]$$

to reduce occurrences of incorrect data value predictions. Empirical comparisons of the above-described embodiments of scoring functions will be disclosed with reference to testing data.

Some embodiments described in the present disclosure are directed to machine learning model architecture that includes encoder networks configured to determine semantic or high-level features of input observation data sets. Such encoder networks may correspond to unsupervised representation learning operations, where latent representations may be produced based on encoder networks for downstream auto-encoder operations.

In scenarios where a set of OOD example data values are available, auto-encoder models may include operations for training a linear classifier (e.g., Logistic Regression) on learned latent representations of both in-distribution and out-of-distribution data to predict in-distribution probability for input data sets.

Where a set of OOD example data values are provided, in some embodiments, the scoring function may be provided as:

$$s_i = \sigma\left(w^T \tilde{z}_i + b\right),$$

where (w, b) denotes coefficients of a linear classifier and $$\tilde{z}_i = f_\theta(\phi_1(x_i)) \| f_\theta(\phi_2(x_i)) \| \ldots \| f_\theta(\phi_K(x_i))$$

denotes concatenation of latent representations projected from semantic invariant transformations.

In some embodiments, the random input transformations may be omitted at this stage and may produce one or more in-distribution scores based on:

$$s_i = \sigma\left(w^T f_\theta(x_i) + v\right).$$

Embodiments of such a scoring function may be configured to demonstrate OOD detection features of embodiments of the present disclosure.

Figure 5:
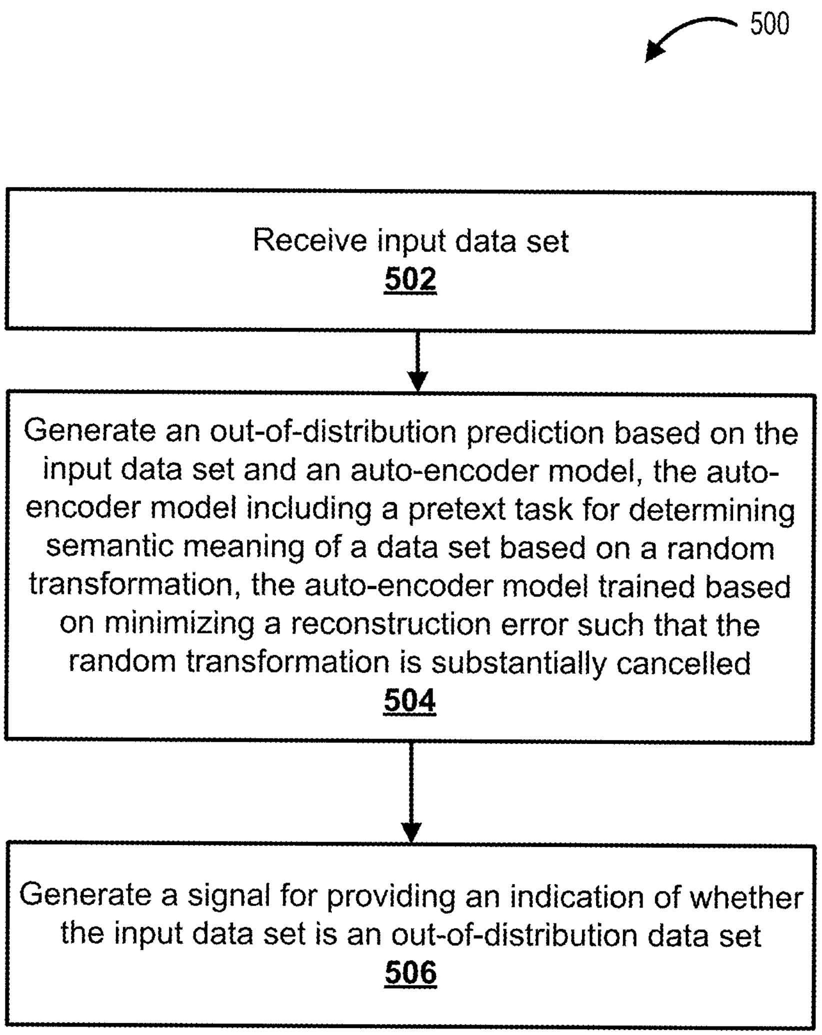
FIG. 5 illustrates a flowchart of a method of machine learning architecture for out-of-distribution data set detection, in accordance with an embodiment of the present disclosure.

Reference is made to FIG. 5, which illustrates a flowchart of a method 500 for machine learning architecture for out-of-distribution data set detection, in accordance with embodiments of the present disclosure. The method 500 may be conducted by the processor 202 of the system 200 (FIG. 2). Processor-executable instructions may be stored in the memory 206 and may be associated with the machine learning application 212 or other processor-executable applications not illustrated in FIG. 2. The method 500 may include operations such as data retrievals, data manipulations, data storage, or other operations, and may include computer-executable operations.

One or more examples described herein may be directed to out-of-distribution data set detection for image data sets. Image data sets may be an example of spatial data sets, where respective image data values may have a spatial correlation with one or more other image data values. It may be understood that embodiments of the present disclosure may also be used for out-of-distribution data set detection of non-image data sets, such as a group of data values having alphanumeric data, textual data, or the like.

At operation 502, the processor may receive an input data set. In some embodiments, the input data set may be an image data set. In some embodiments, the input data set may be a data set including alphanumeric data, such as textual data. In some embodiments, the input data set may be received from the client device 210 (FIG. 2).

At operation 504, the processor may generate an out-of-distribution prediction based on the input data set and an auto-encoder model. The auto-encoder model may include a pretext task defined by a random transformation. The auto-encoder model may be trained based on reducing a reconstruction error such that the random transformation may be substantially cancelled by a decoder of the auto-encoder network.

In some embodiments, the auto-encoder model may be based on a Wasserstein Auto-encoder having one or more features described in the present disclosure. When the auto-encoder model is trained to capture or encode semantic meaning, the auto-encoder model may advantageously provide increased accuracy during OOD data set detection operations.

In some embodiments, the auto-encoder model may include operations of a pretext task including a set of random transformation functions to transform input data sets into different observations, while preserving semantic meaning. In some embodiments, training the auto-encoder model may include operations to reduce a reconstruction error of the auto-encoder, such that in a many-to-one mapping task, the random transformation function may be cancelled by the auto-encoder network. That is, the auto-encoder network may be trained to encode invariant information of input data sets.

In some embodiments, the random transformation may be a set of random transformation functions that transform input data into different observations, while preserving semantic meaning. In some embodiments, the random transformation may be a rotation transformation function.

In scenarios where out-of-distribution data may not be available or may not be accessible, the processor may conduct operations based on mean squared error as a confidence score for OOD detection.

In scenarios where a set of out-of-distribution data is available, the processor may conduct operations based on few-shot supervised learning for classifying input data.

In some embodiments, the auto-encoder model may be an asymmetric auto-encoder model. For example, the model may minimize the decoder's expressive ability by removing global transformation (fully connected layers). In some embodiments, the auto-encoder model may include an encoder network having a complex DenseNet architecture, such that global information may maximally be encoded.

At operation 506, the processor may generate a signal for providing an indication of whether the input data set is an out-of-distribution data set.

In some scenarios, it may be beneficial to identify input data sets that may be considered out-of-distribution, at least, because such input data sets may impact downstream model training or lead to unrepresentative predictions in undesirable or unintended ways.

Experiment and Evaluation

To illustrate features of embodiments described in the present disclosure, experiments were conducted for addressing several queries.

Q1: Is the proposed OOD detection approach competitive compared to the other machine learning architectures configured for OOD detection based on benchmark data sets?

Q2: Can the proposed features based on a Wasserstein Auto-encoder capture semantic meaning?

Q3: Do features of embodiments of scoring functions described herein perform better than simple maximum likelihood estimation through MSE?

Q4: Is the proposed model computationally efficient compared to other example OOD detection models in terms of memory usage or inference time?

Q5: In terms of unsupervised representation learning (such as identifying high-level properties (or knowledge) of in-distribution data), how well does do features of embodiments of OOD detection models compare to other representation learning algorithms?

Benchmark Datasets

In some experiments, two sets of datasets grouped by image shape were used to benchmark experiment results. Each pair of datasets in a similar group would be mutual OOD examples. In particular, for the smallest image shape (28,28,1), two datasets were used: MNIST and FashionMNIST. An evaluation was conducted for OOD detection performance for both directions. An OOD detector was trained based on MNIST and then tested on FashionMNIST, and vice versa. The second group of the dataset included the image shape (32,32,3), which contained CIFAR-10, SVHN, LSUN. For the group with the largest image size (64,64,3), CelebA and Anime datasets were used.

Baseline Models

For OOD detection, embodiments of models disclosed herein were compared with the following algorism:

MaxSoftmax (MS) [Hendrycks Gimpel (2016)]: Using the maximum classification confidence score as an indicator of OOD detection.

ODIN [Liang et al. (2017)]: An enhanced MaxSoftmax detector, which input preprocessing and temperature to control the OOD detection performance.

Mahalanobis (MH) [Lee et~al. (2018)]: Aggregating the feature maps from different layer of a deep classifier as feature set to train OOD detector, which requires OOD examples.

Outlier Exposure (OE) [Hendrycks et-al. (2018)]: Training in-distribution classifier along with OOD examples as additional signal that reduce OOD confidence score for OOD examples explicitly.

Likelihood Ratio (LR) [Ren et~al. (2019)]: Training two generative models (one for complete data and one for background data) and estimating the absolute difference of predicted density between the two models to obtain an OOD score.

WAIC [Choi et~al. (2018)]: Training multiple Variational Auto-encoders and using statistical information such as expectation and variance of density estimation to detect OOD examples.

Typicality (TP) [Nalisnick et al. (2019)]: Training a Glow model to capture in-distribution data distribution and detecting OOD examples through estimating distance from observation density to the typical set.

Evaluation Metrics

Empirical results for OOD detection based on metrics are as follows:

TNR at 95% TPR: The true negative rate of out-distribution examples when the true positive rate is 95%.

AUROC: Area Under the Receiver Operating Characteristic curve. As AUROC may be independent of the OOD threshold, the AUROC metric may evaluate the probability that OOD example score is higher than that of in-distribution data.

For evaluating the performance of representation learning, classification F1 and accuracy score of in-distribution data based on a linear classifier were recorded (Logistic Regression).

OOD Detection performance: From the above-described experiments, data associated with embodiments of the CWAE model and other example OOD detection methods are illustrated in the tables below.

| Datasets | | MaxSoftmax | | ODIN | | MHC@ 100 | | OE | |
|---|---|---|---|---|---|---|---|---|---|
| In | Out | TNR TPR95 | AUC | TNR TPR95 | AUC | TNR TPR95 | AUC | TNR TPR95 | AUC |
| MNIST | Fashion | 0.703 | 0.882 | 0.707 | 0.884 | 0.999 | 0.999 | 0.999 | 0.999 |
| Fashion | MNIST | 0.466 | 0.908 | 0.766 | 0.959 | 0.847 | 0.973 | 0.990 | 0.998 |
| Cifar10 | SVHN | 0.257 | 0.850 | 0.559 | 0.893 | 0.759 | 0.952 | 0.992 | 0.998 |
| | LSUN | 0.232 | 0.829 | 0.330 | 0.844 | 1.000 | 0.999 | 0.483 | 0.901 |
| | ImageNet | 0.196 | 0.776 | 0.263 | 0.764 | 0.681 | 0.917 | 0.559 | 0.897 |
| SVHN | Cifar10 | 0.548 | 0.919 | 0.615 | 0.914 | 0.759 | 0.952 | 0.995 | 0.998 |
| | LSUN | 0.483 | 0.897 | 0.543 | 0.881 | 1.000 | 0.999 | 0.999 | 0.999 |
| | ImageNet | 0.528 | 0.917 | 0.619 | 0.916 | 0.682 | 0.917 | 0.999 | 0.999 |

| Datasets | | LikehoodRatio | | WAIC | | Typicality | | CWAE | | CWAE-FS@ 100 | |
|---|---|---|---|---|---|---|---|---|---|---|---|
| In | Out | TNR TPR95 | AUC | TNR TPR95 | AUC | TNR TPR95 | AUC | TNR TNR95 | AUC | TNR TPR95 | AUC |
| MNIST | Fashion | 0.999 | 0.999 | 0.887 | 0.973 | 0.987 | 0.996 | 0.989 | 0.984 | 0.991 | 0.997 |
| Fashion | MNIST | 0.004 | 0.238 | 0.145 | 0.793 | 0.248 | 0.852 | 0.991 | 0.992 | 0.997 | 0.998 |
| Cifar10 | SVHN | 0.015 | 0.512 | 0.096 | 0.530 | 0.621 | 0.938 | 0.479 | 0.922 | 0.983 | 0.996 |
| | LSUN | 0.015 | 0.514 | 0.038 | 0.504 | 0.002 | 0.104 | 0.177 | 0.763 | 0.921 | 0.984 |
| | ImageNet | 0.028 | 0.560 | 0.026 | 0.498 | 0.006 | 0.127 | 0.254 | 0.829 | 0.788 | 0.955 |

-continued

| | | LikehoodRatio | | WAIC | | Typicality | | CWAE | | CWAE-FS@ 100 | |
|---|---|---|---|---|---|---|---|---|---|---|---|
| Datasets | | TNR | | TNR | | TNR | | TNR | | TNR | |
| In | Out | TPR95 | AUC | TPR95 | AUC | TPR95 | AUC | TNR95 | AUC | TPR95 | AUC |
| SVHN | Cifar10 | 0.023 | 0.515 | 0.015 | 0.529 | 0.124 | 0.862 | 0.695 | 0.941 | 0.672 | 0.940 |
| | LSUN | 0.019 | 0.509 | 0.012 | 0.579 | 0.360 | 0.944 | 0.703 | 0.952 | 0.821 | 0.965 |
| | ImageNet | 0.038 | 0.552 | 0.009 | 0.504 | 0.256 | 0.937 | 0.682 | 0.942 | 0.775 | 0.949 |

In some scenarios, the more information an algorithm accesses, the more favourable the identified performance. In particular, supervised model approaches, such as Mahalanobis (MH) and Outlier Exposure (OE), appear to outperform other algorithms as they access out-of-distribution data examples.

Embodiments of the model disclosed herein include representation learning features, and it is noted that the CWAE (e.g., customized Wasserstein Auto-Encoder) with few-shot learning (CWAE-FS) shows competitive performance to the MH and OE. In contrast, models or algorithms without any supervision (including in-distribution labels), such as Likelihood Ratio, WAIC, may perform relatively poorly. One exception may be the Typicality based detector, which may be associated with a Normalizing Flow-based generative model, Glow [Kingma Dhariwal (2018)], which may conduct operations for exact density estimation.

For some embodiments of models, the detection performance from different directions may be inconsistent. In particular, the Likelihood Ratio appears to perform well on the task of MNIST vs Fashion, while its performance may be unsatisfactorily in the other direction/way. This observation may reflect comments of the literature [Nalisnick et~al. (2018)]. In some scenarios, while WAIC and Typicality may aim to address the problem, their improvement may be limited, as shown in Table 1 above. Specifically, both of the algorithms may fail in the case of Cifar10 vs LSUN (and Imagenet). It is believed that they fail to capture the semantic meaning of in-distribution data but wrongly focus on statistical properties.

In some embodiments, the embodiments of features of an auto-encoder model disclosed herein (e.g., customized WAE) without exploiting OOD examples may demonstrate stable OOD detection performance on all of the benchmark tasks. Embodiments of models of the present disclosure appear to repeatedly outperforms the classic algorithms, such as MaxSoftmax and ODIN, that leverage in-distribution labels. While the strongest competitor, Typicality with Glow, may result in relatively better performance in some cases, its inference cost may be computationally more expensive due to the exponentially larger number of parameters and nonlinear transformation layers.

It has been observed that when embodiments of Auto-encoders (e.g., CWAE) described herein are refined with a small number of OOD examples (100 examples in the table), its performance outperforms all existing work on large benchmark datasets. This observation demonstrates the benefit of levering on representation techniques.

Figure 6:
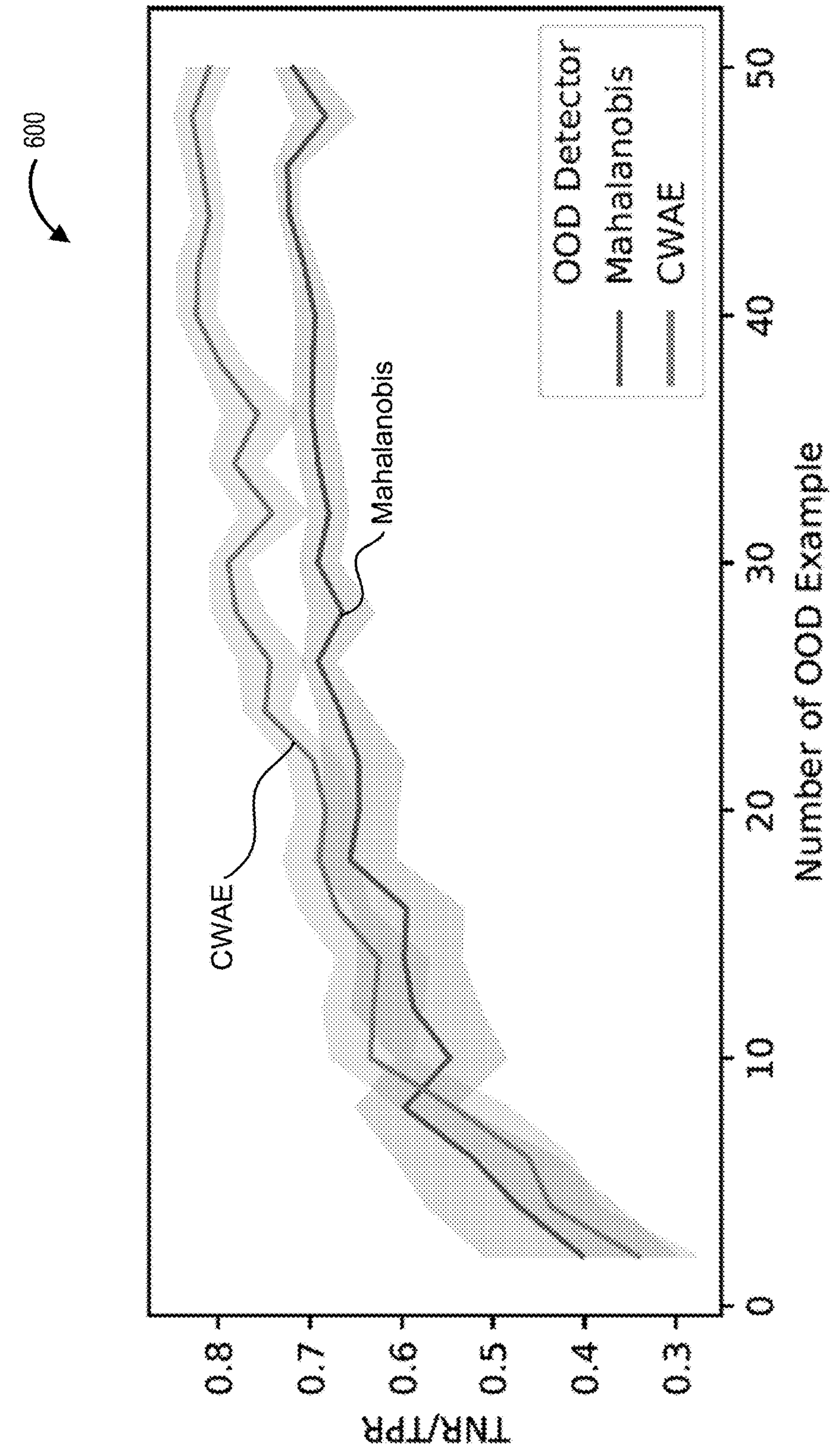
FIG. 6 illustrates a plot of data 600 associated with few-shot learning for OOD detection, in accordance with embodiments of the present disclosure.

FIG. 6 illustrates data associated with few-shot learning for OOD detection, in accordance with embodiments of the present disclosure. In FIG. 6, the performance of OOD detection improves when the OOD examples are available. The curve may be aggregated over 20 or more independent experiment trials.

In particular, FIG. 6 illustrates a performance comparison between CWAE-FS and Mahalanobis detectors given a limited number of out-distribution examples. Among the candidate models compared (as outlined in the tables above), the Mahalanobis and CWAE-FS models may conduct few-shot learning to improve performance. While an Outlier Exposure (OE) model may leverage OOD examples, it may require re-training the auxiliary model from scratch, which introduces an additional aspect of uncertainty.

CWAE-FS and Mahalanobis detectors may provide comparable OOD detection performance (considerable overlapping between performance distribution) when there are less than 20 out-distribution examples available. However, when more out-distribution data points were available, embodiments of the proposed CWAE-FS model disclosed herein continuously exhibited improved performance and increased a performance gap from performance of the Mahalanobis detector. This observation shows the advantage of data-driven representation learning comparing to the manually designed representations. Mahalanobis detector (Lee et al., 2018) may collect observation representations by manually computing Mahalanobis distance between expected activations and observed activations for an input observation on each layer of a deep neural network.

Embodiments of the proposed CWAE training approach of the present disclosure may be compared with other Auto-encoder training models for investigating how beneficial it may be to capture the semantic meaning as it relates to OOD detection. To remove evaluation ambiguity, prediction MSE may be used as the OOD scoring function for tested models. FIG. 1 illustrated the FP/TP curve of two candidate auto-encoder models, one trained with a CWAE objective and another trained with a MSE loss. While these auto-encoders exhibited substantially similar reconstruction loss during their training time, their OOD detection ability may be distinguishable.

Figure 7:
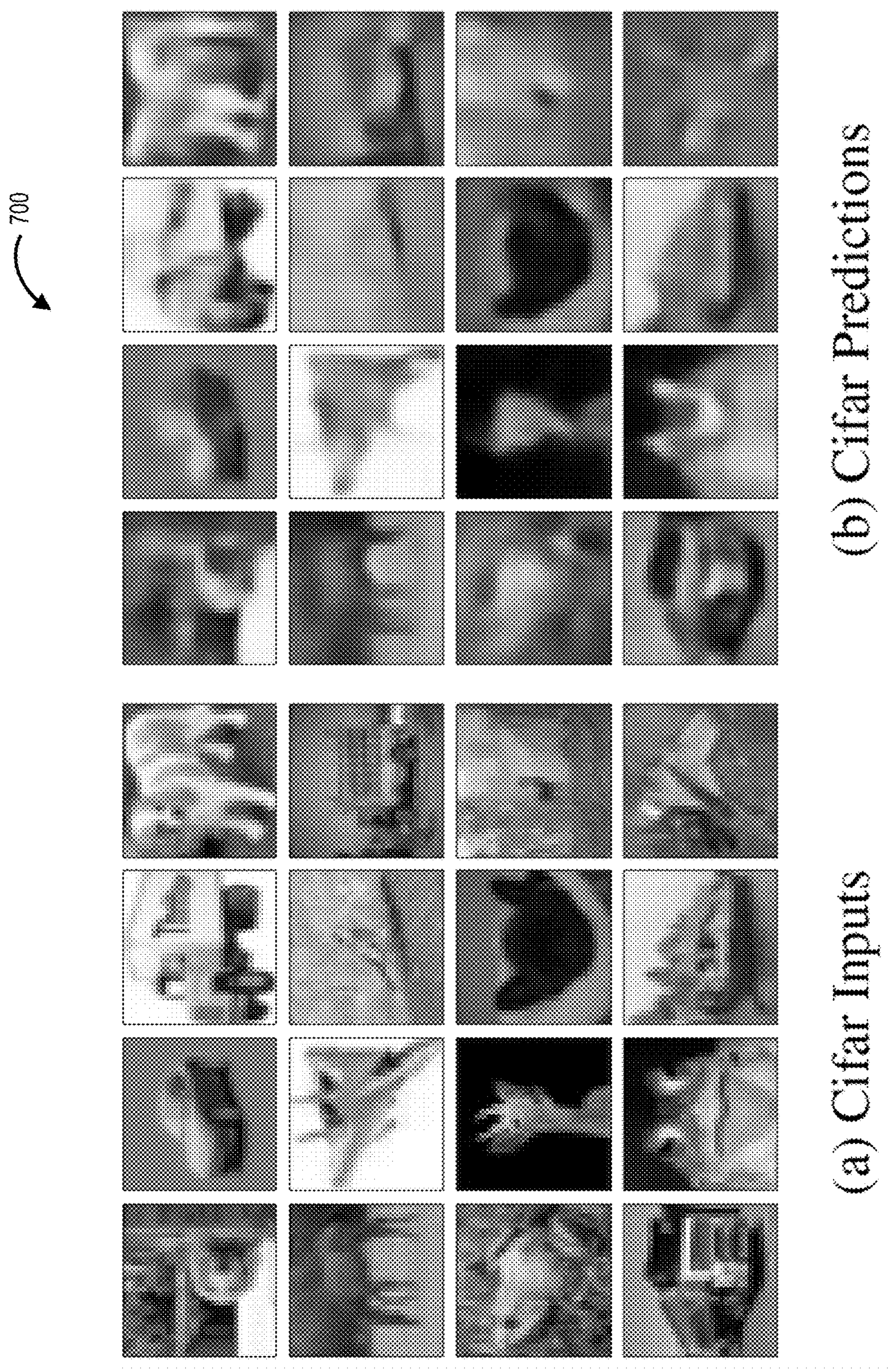
FIGS. 7 and 8 illustrate predictions based on Cifar10 and SVHN from embodiments of a CWAE model trained based on a Cifar10 data set, in accordance with embodiments of the present disclosure.
Figure 8:
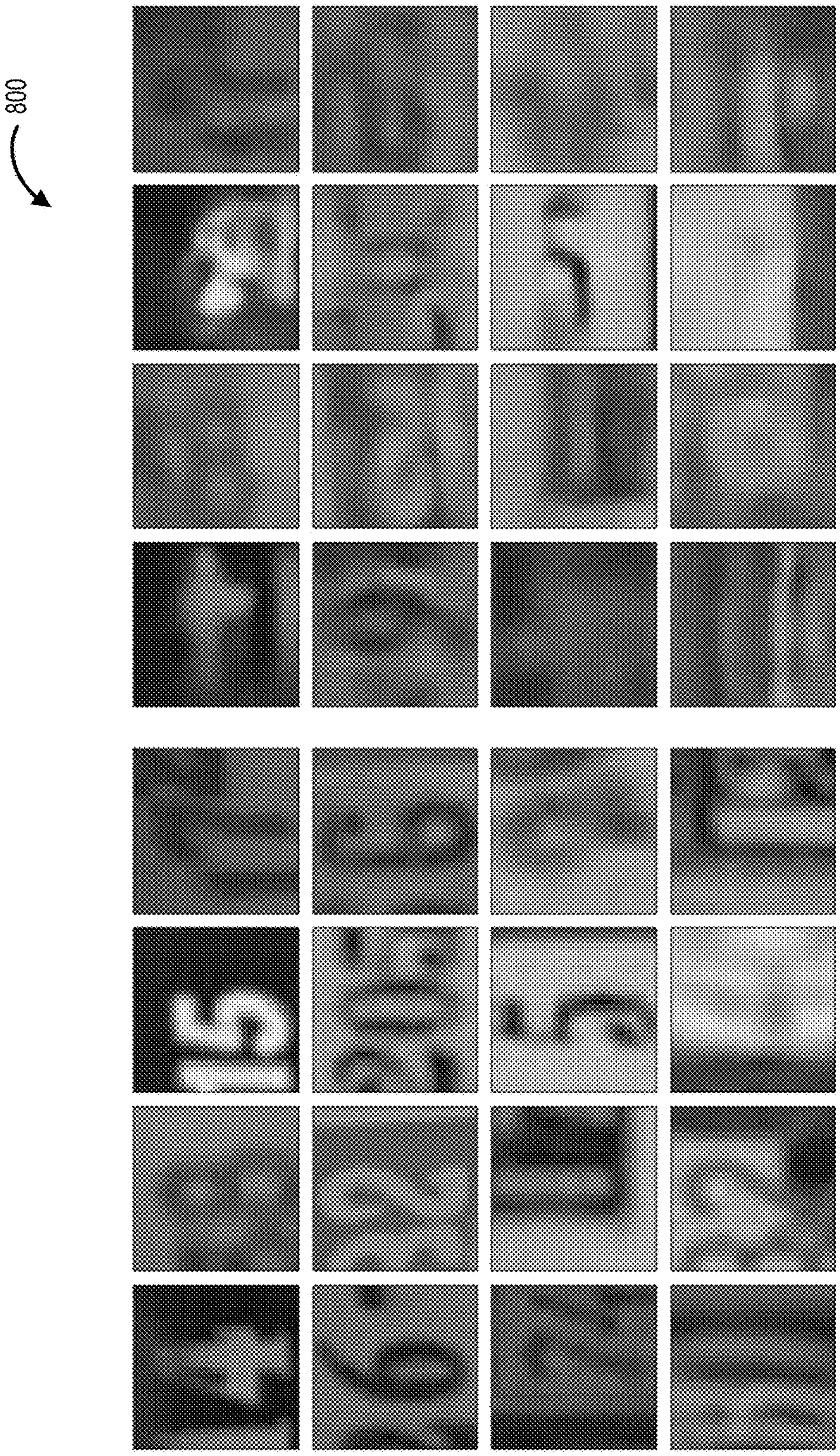

In experiments, the reason behind the observation was investigated by examining concrete inference examples. FIGS. 7 and 8 illustrate photos 700, 800 showing predictions based on Cifar10 and SVHN from embodiments of a CWAE model trained on Cifar10. In particular, FIGS. 7 and 8 illustrate how embodiments of the proposed model herein captures the OOD examples.

In FIG. 7, the Cifar10 images and corresponding predictions may be based on the CWAE model. It was observed that most predictions may correctly reconstruct their inputs. FIG. 8 illustrates the SVHN images and the corresponding predictions. The reconstructions may erroneously rotate their inputs.

Since embodiments of the proposed CWAE model may be trained on the Cifar10 dataset, the model may capture the basic semantic information of in-distribution data set inputs. For example, tires of a sedan have to be on the bottom relative to other car components. While embodiments of the model may occasionally make mistakes, such as the aircraft shown in the bottom right of FIG. 7(*b*), it may be reasonable since both of the orientations may be a correct pose. In contrast, embodiments of the model disclosed herein may not be aware of any semantic meaning of out-distribution inputs, and it may randomly rotate the inputs to match patterns of in-distribution data. For example, the digit 15 in FIG. 8 may have been transformed into a cat face by rotating it 270 degrees.

Some examples of a proposed scoring function may be an expectation of normalized MSE. In some embodiments, a simplified version of the proposed scoring function may be provided, where we remove an outer expectation term. In particular, an example simplified scoring function may be provided as:

$$s_i = 1 - \frac{\mathcal{L}(x_i, \hat{x}_i)}{\sum_{k'}^{K} \mathcal{L}(x_i, \phi_{k'}(\hat{x}_i))}$$

Figure 9:
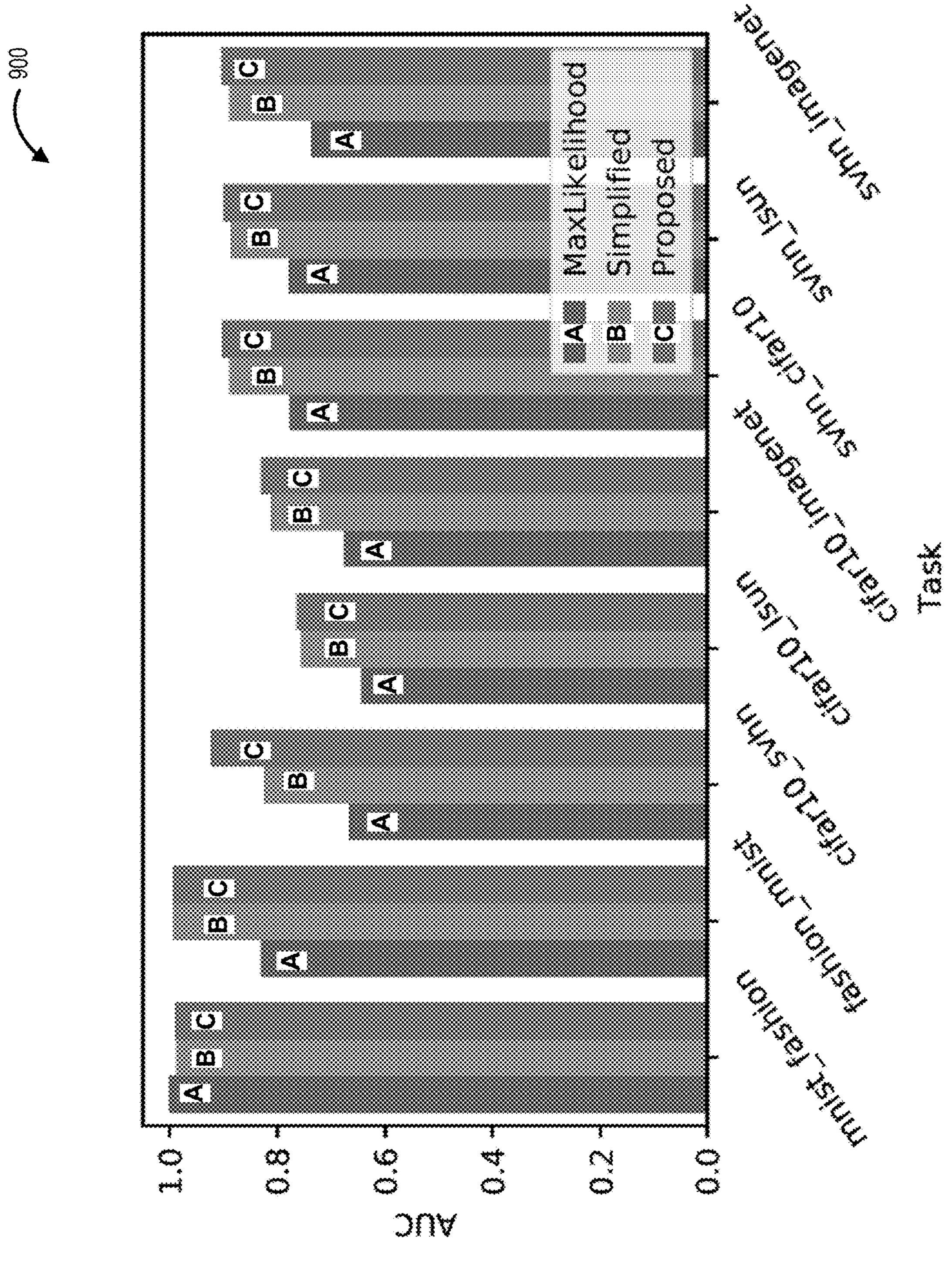
FIG. 9 illustrates a comparison among three scoring functions on embodiments of a trained CWAE model, in accordance with embodiments of the present disclosure.

FIG. 9 illustrates a chart 900 showing impact of a scoring function of OOD detection, in accordance with an embodiment of the present disclosure. Scoring functions may be compared on embodiments of the pre-trained CWAE model. Task name may consist of in-distribution and out-distribution data names.

FIG. 9 illustrates a comparison among three scoring functions on embodiments of the trained CWAE models disclosed herein. MaxLikelihood may estimate a Mean Squared Error of a reconstruction as a scoring function, may be a straightforward scoring function of deep generative model-based OOD detection algorithms. In FIG. 9, while the MaxLikelihood function may perform well on the easiest OOD detection task (MNIST vs Fashion), its performance shows degradation when deployed on practical tasks. The simplified scoring function may work well in most detection tasks, but it may have noticeable performance gaps to the proposed scoring function, as disclosed in the present disclosure. The proposed scoring function described herein may be provided as:

$$\mathcal{S}(x_i) = \frac{1}{K}\sum_{k}^{K}\left[1 - \frac{\|\phi_k(x_i), \phi_k(\hat{x}_i)\|^2}{\sum_{k'}^{K}\|\phi_k(x_i), \phi_{k'}(\hat{x}_i)\|^2}\right]$$

The observations illustrated in FIG. 9 show that the proposed scoring function may be useful in improving OOD detection performance.

Figure 10:
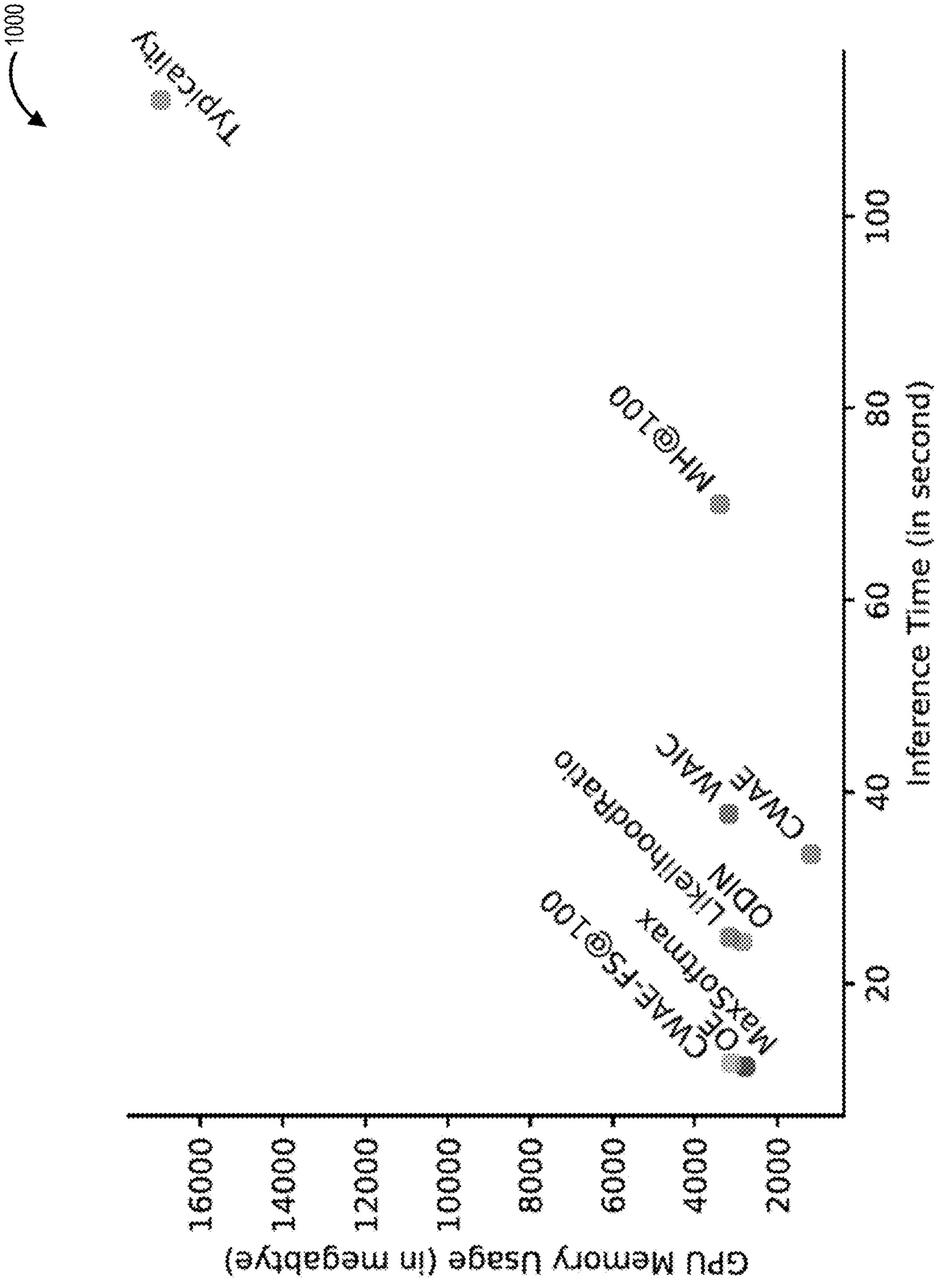
FIG. 10 illustrates a graphical plot illustrating comparisons of computational power consumption, in accordance with embodiments of the present disclosure.

Aside from model detection performance, computational resource consumption may be a consideration when implementing OOD detection methods into a product line. FIG. 10 illustrates a graphical plot 1000 illustrating comparisons of computational power consumption (GPU memory and interface time), in accordance with embodiments of the present disclosure. The graphical plot shows the resource consumption based on Cifar10 versus SVHN tasks.

In particular, FIG. 10 shows the average inference consumption of embodiments of OOD detection operations. For example, embodiments of CWAE model operations show relatively low GPU usage when compared to other model operations. When the CWAE is enhanced with few-shot learning, it may be observed that the inference time is reduced. This may be because the CWAE-FS model operations no longer requires the decoder part of the CWAE model, and the model may not perform a rotation based scoring function. However, as few-shot learning introduces an additional classification model for online refinement purposes, its GPU memory usage increases. Compared to other baselines, the CWAE-FS model operations may maintain low resource consumption. It may be noted that the Typicality model may be associated with a high resource consumption because it is associated with a Glow model that provides significant performance guarantee in prior experiments.

Embodiments of the present disclosure include auto-encoders having customized training operations to maximize its ability to conduct downstream OOD detection operations. Experiments were conducted to determine whether the customizations to embodiments of auto-encoders may be effective at capturing high-level knowledge or semantic data of training data sets.

Figure 11:
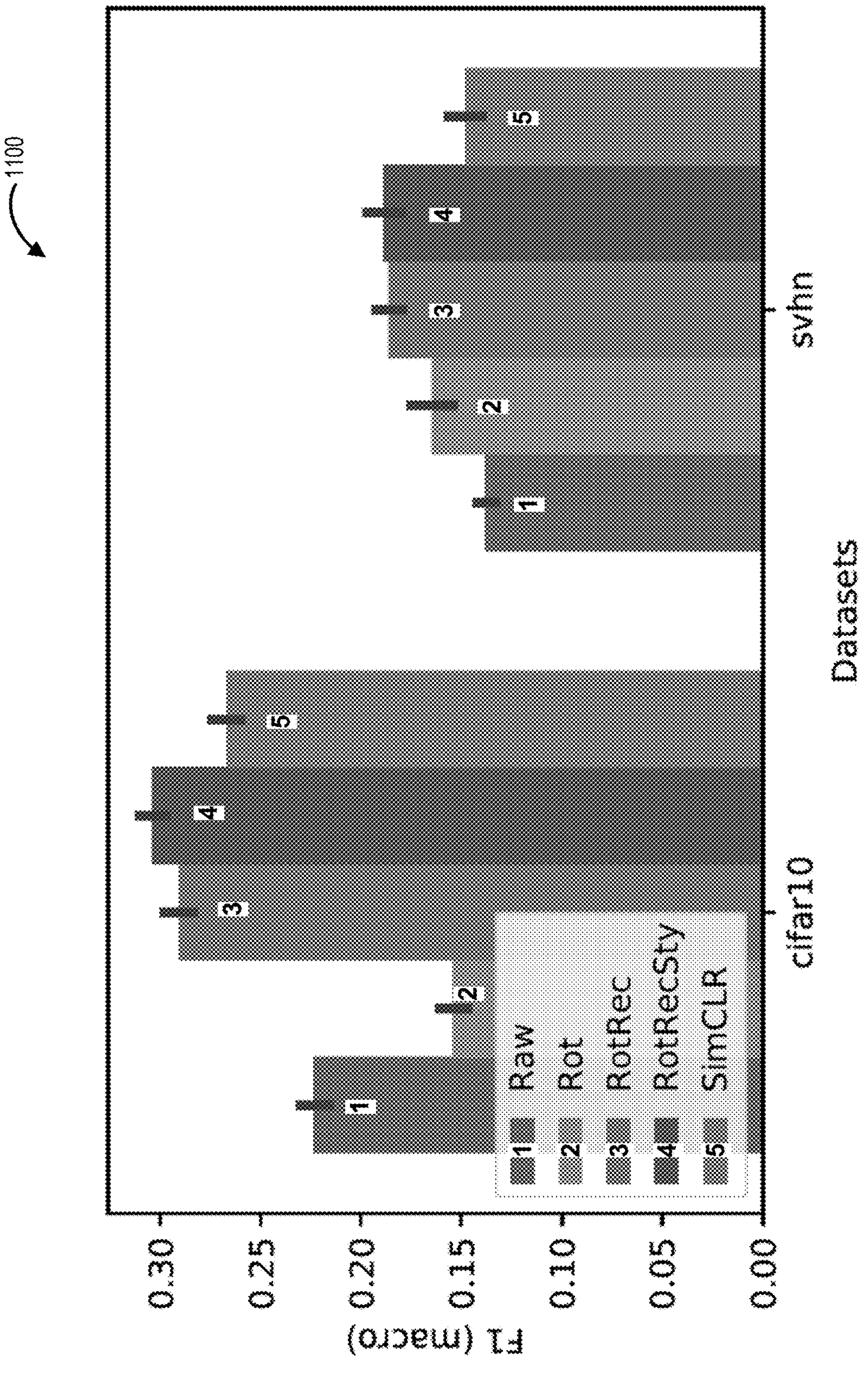
FIG. 11 illustrates a plot illustrating a performance comparison of representation learning, in accordance with embodiments of the present disclosure.

FIG. 11 illustrates a plot 1100 illustrating performance comparison of representation learning (F1-macro) on auxiliary models trained with different loss functions, in accordance with embodiments of the present disclosure. On the two benchmark datasets, embodiments may include operations for training linear classifier (Logistic Regression) on top of the representations by using 128 data points (a batch) in the training dataset. Results were collected from 20 independent runs.

FIG. 11 shows experiments where latent representations of the auto-encoder are used to train a classifier for in-distribution data. If the classifier is observed to perform well on test samples, it is believed that the trained auto-encoder may capture high-quality knowledge of in-distribution data. These experiments were used to compare embodiments of the proposed CWAE with other customization variant models.

In experiments, RotRecSty may represent the proposed CWAE model since its training schema includes Rotation, Reconstruction, and Style Enhancement objectives. Correspondingly Rot denotes Rotation based representation learning algorithm [Gidaris et al. (2018)], and RotRec denotes a simplified CWAE model that may not enforce style consistency. To better understand its performance in the overall literature, experiments may include raw input and state-of-the-art SimCLR [Chen et al. (2020)] as references. To provide a balanced comparison, experiments may include operations of the encoder of CWAE to be based on DenseNet, having an identical architecture for training Rotation and SimCLR models.

In some scenarios, incorporating reconstruction objective may improve the classification performance as compared to the primary Rotation pretext task on both datasets. Style enhancement may further enhance the performance with a small gap. In some scenarios, embodiments of the proposed CWAE model disclosed herein may outperform the state-of-the-art SimCLR model in conducted experiments. These observations may be attributed to the limited expressible ability of the backbone DenseNet model that cannot capture sufficient information to support SimCLR. These observations may suggest the advantage of the proposed model for representation learning given relatively simple network architectures.

In some scenarios, it may be desirable to track failure cases observed among testing of embodiments described in the present disclosure. In particular, it may be desirable to deduce why models may incorrectly identify some in-distribution data as out-of-distribution data that hurt overall model performance.

Figure 12:
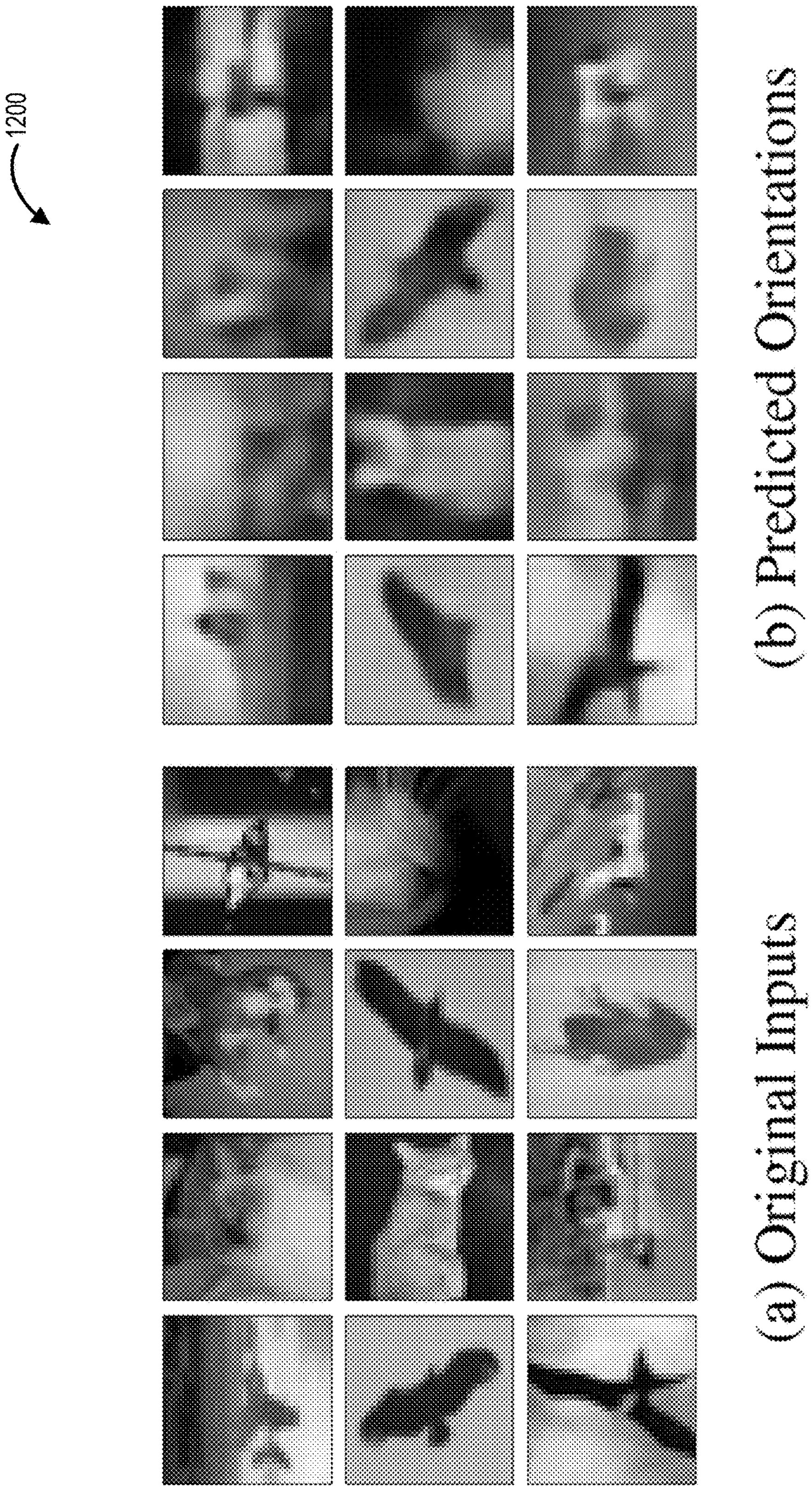
FIG. 12 illustrates false positive OOD detection examples, in accordance with embodiments of the present disclosure.

FIG. 12 illustrates images 1200 showing false positive OOD detection examples, in accordance with embodiments of the present disclosure. In-distribution data may be incorrectly identified as out-distribution data by embodiment models due to ambiguity of "correct" orientation for objects.

As examples, FIG. 12 shows some false positive detection examples based on the Cifar10 dataset. Scoring functions described in the present disclosure may provide low in-distribution scores to those examples due to wrong rotations. While most false-positive examples may be due to the ambiguity of the "correct" orientation, embodiments of models of the present disclosure may have limitations that the input images have to follow consistent data on correct image orientation to maintain its performance. These observations may suggest that the proposed model may be suboptimal for tasks that may be associated with changing camera (input observation) angles.

Embodiments of the present disclosure provide an efficient out-of-distribution detector known as a customized Wasserstein Auto-encoder (CWAE). The proposed features of auto-encoders may be based on two sets of customization features. Firstly, embodiments of auto-encoders of the present disclosure may include customized training features (e.g., for both loss function and architecture) for downstream OOD detection. Secondly, embodiments of the customized auto-encoders may be configured with OOD scoring functions. Embodiments of the CWAE address OOD detection challenges in two scenarios: (1) when OOD examples may be inaccessible, the CWAE may detect OOD data values via a proposed normalized MSE scoring function; (2) when a set of OOD examples may be available, the CWAE may identify OOD points via few-shot learning on learned latent representations. On two groups of benchmark OOD detection data sets, experiments were described showing that the performance of CWAE may be competitive with other types of OOD detection methods identified as robust or scalable.

Figure 13:
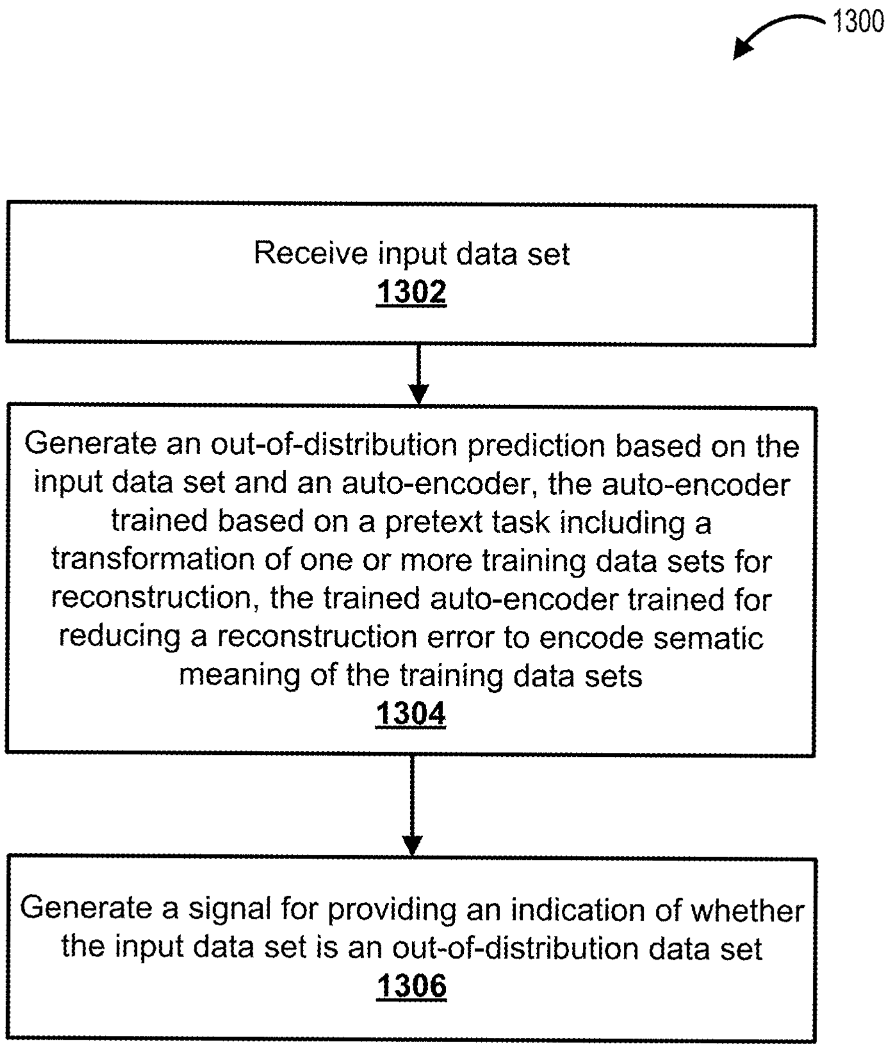
FIG. 13 illustrates a flowchart of a method of machine learning architecture for out-of-distribution data set detection, in accordance with embodiments of the present disclosure.

Reference is made to FIG. 13, which illustrates a flowchart of a method 1300 of machine learning architecture for out-of-distribution data set detection., in accordance with embodiments of the present disclosure. The method 1300 may be conducted by the processor 202 of the system 200 (FIG. 2). Processor-executable instructions may be stored in the memory 206 and may be associated with the machine learning application 212 or other processor-executable applications not illustrated in FIG. 2. The method 1300 may include operations such as data retrievals, data manipulations, data storage, or other operations, and may include computer-executable operations.

For ease of exposition, the method 1300 may be described based on data sets representing image data sets. More generally, it may be understood that the method 1300 may include operations for spatial data sets or sequential data sets.

At operation 1302, the processor may receive an input data set. Input data sets may be spatial data sets or sequential data sets, among examples. Example spatial data sets may include image data sets, where respective image values may have spatial correlation among respective pixel data values in the data set. In some examples, spatial data sets may be amendable to representation by embeddings.

Example sequential data sets may be time-series data sets, where features may be inherent in ordering of data values. For instance, sequential data sets may include data sets representing DNA sequences, a word cloud, performance data for stocks or other financial instruments, among other examples.

At operation 1304, the processor may generate an out-of-distribution prediction based on the input data set and an auto-encoder. The auto-encoder may be a machine learning model trained based on one or a combination of pretext tasks. Pretext tasks may include one or more transformations of training data sets for reconstruction. The trained auto-encoder may be trained for reducing a reconstruction error to encode semantic meaning of the training datasets.

In some embodiments, the auto-encoder may be based on a Wasserstein auto-encoder. The auto-encoder may be configured to identify observed data sets that may be associated with features that are beyond an expected range (e.g., out-of-distribution). Out-of-distribution data sets may include data values that may be unrealistic or untenable relative to baseline or expected data sets. For instance, image data representing an automobile may be identified as out-of-distribution relative to an airplane.

In some embodiments, the transformation may be a set of transformations for transforming a training data set into an alternate data set representation, such that the auto-encoder may be trained to encode invariant or semantic features (or knowledge) of the training data set.

In some embodiments, transformations may include rotation transformations for image data sets, segmentation transformations for image data sets, among other examples. In some embodiments, transformations may include sequential ordering perturbation transformations for time-series data, among other examples.

In some embodiments, the auto-encoder model may be trained based on a Gram matrix of the training data set. The Gram matrix may be associated with a base pooling operation for identifying structural correlations among data values of the training data set. The base pooling operation may be for reducing data set dimensions.

In some embodiments, the auto-encoder model may include a decoder network having removed fully-connected layers for minimizing expressive properties of the decoder network to provide a regularized asymmetric auto-encoder. Such features may be beneficial in scenarios when the encoder capability may be limited, such that both the encoder and decoder may participate in the encoding process. In such an example scenario, the latent representation extracted from the encoder may be less informative. In such embodiments, the encoder network may be replaced with or configured as a complex DenseNet architecture for maximizing its capability to encode global information of input data sets.

In some embodiments, the auto-encoder model may include scoring operations based on an error value associated with predicted reconstruction of the transformed training data set and a partition operation is within a probability range. In some embodiments, the scoring operations may be defined by:

$$\mathcal{S}(x_i) = 1 - \frac{\|x_i - \hat{x}_i\|^2}{\sum_{k'}^{K} \|x_i - \phi_{k'}(\hat{x}_i)\|^2},$$

where $\hat{x}_i = f_\vartheta(f_\theta(x))$ denotes predicted reconstruction, $x_i$ is an observed data value, and $\phi_k$ represents at least one transformation.

In some scenarios, the above described scoring operation may be suboptimal for scenarios where OOD samples may be inadvertently predicted with a correct orientation (e.g., resulting in lower precision during OOD detection). Thus, in some embodiments, the auto-encoder model may include scoring operations including an outer loop of geometric transformations to minimize falsely predicted in-distribution observations. The scoring operations may be defined by:

$$\mathcal{S}(x_i) = \frac{1}{K}\sum_{k}^{K}\left[1 - \frac{\|\phi_k(x_i), \phi_k(\hat{x}_i)\|^2}{\sum_{k'}^{K}\|\phi_k(x_i), \phi_{k'}(\hat{x}_i)\|^2}\right],$$

where $\hat{x}_i = f_\vartheta(f_\theta(x))$ denotes predicted reconstruction, $x_i$ is an observed data value, and $\phi_k$ represents at least one transformation.

In some embodiments, the auto-encoder model may include scoring operations based on a linear classifier trained by learned latent representation of in-distribution and out-of-distribution data sets.

In some embodiments, the scoring operations may be defined by the scoring function:

$$s_i = \sigma(w^T \tilde{z}_i + b),$$

where (w, b) denotes coefficients of linear classifier and $$\tilde{z}_i = f_\theta(\phi_1(x_i)) \| f_\theta(\phi_2(x_i)) \| \ldots \| f_\theta(\phi_K(x_i))$$

denotes concatenation of latent representations projected from semantic invariant transformations.

At operation 1306, the processor may generate a signal for providing an indication of whether the input data set is an out-of-distribution data set.

In some scenarios, identifying out-of-distribution data sets may be beneficial for pre-empting operations associated with adversarial attacks, thereby leading to unintended alteration or subsequent training of machine learning models.

In some scenarios, identifying out-of-distribution data sets may be beneficial for diagnostics operations, such as for evaluating machine learning model failure modes and identifying a degree to which the failure mode may be realistic.

In some scenarios, identifying out-of-distribution data sets may be beneficial for pre-emptively identifying machine learning model drift, in response to training data determined to be out-of-distribution.

In some scenarios, identifying out-of-distribution data sets may be beneficial for generating subsequent training data sets for machine learning models by distilling data sets to reduce a quantity of out-of-distribution data sets.

As an example, the processor may identify one or more data values of the input data set as being out-of-distribution by a threshold amount. The threshold amount may be a value that differentiates unrealistic data features from data features within an acceptable feature range. The processor may generate updated training data set including the identified one or more out-of-distribution data values, and provide the training data set for training the auto-encoder based on the updated training data set. Other examples operations of distilling data sets for subsequent machine learning training operations may be used.

The term "connected" or "coupled to" may include both direct coupling (in which two elements that are coupled to each other contact each other) and indirect coupling (in which at least one additional element is located between the two elements).

Although the embodiments have been described in detail, it should be understood that various changes, substitutions and alterations can be made herein without departing from the scope. Moreover, the scope of the present disclosure is not intended to be limited to the particular embodiments of the process, machine, manufacture, composition of matter, means, methods and steps described in the specification.

As one of ordinary skill in the art will readily appreciate from the disclosure, processes, machines, manufacture, compositions of matter, means, methods, or steps, presently existing or later to be developed, that perform substantially the same function or achieve substantially the same result as the corresponding embodiments described herein may be utilized. Accordingly, the appended claims are intended to include within their scope such processes, machines, manufacture, compositions of matter, means, methods, or steps.

The description provides many example embodiments of the inventive subject matter. Although each embodiment represents a single combination of inventive elements, the inventive subject matter is considered to include all possible combinations of the disclosed elements. Thus if one embodiment comprises elements A, B, and C, and a second embodiment comprises elements B and D, then the inventive subject matter is also considered to include other remaining combinations of A, B, C, or D, even if not explicitly disclosed.

The embodiments of the devices, systems and methods described herein may be implemented in a combination of both hardware and software. These embodiments may be implemented on programmable computers, each computer including at least one processor, a data storage system (including volatile memory or non-volatile memory or other data storage elements or a combination thereof), and at least one communication interface.

Program code is applied to input data to perform the functions described herein and to generate output information. The output information is applied to one or more output devices. In some embodiments, the communication interface may be a network communication interface. In embodiments in which elements may be combined, the communication interface may be a software communication interface, such as those for inter-process communication. In still other embodiments, there may be a combination of communication interfaces implemented as hardware, software, and combination thereof.

Throughout the foregoing discussion, numerous references will be made regarding servers, services, interfaces, portals, platforms, or other systems formed from computing devices. It should be appreciated that the use of such terms is deemed to represent one or more computing devices having at least one processor configured to execute software instructions stored on a computer readable tangible, non-transitory medium. For example, a server can include one or more computers operating as a web server, database server, or other type of computer server in a manner to fulfill described roles, responsibilities, or functions.

The technical solution of embodiments may be in the form of a software product. The software product may be stored in a non-volatile or non-transitory storage medium, which can be a compact disk read-only memory (CD-ROM), a USB flash disk, or a removable hard disk. The software product includes a number of instructions that enable a computer device (personal computer, server, or network device) to execute the methods provided by the embodiments.

The embodiments described herein are implemented by physical computer hardware, including computing devices, servers, receivers, transmitters, processors, memory, displays, and networks. The embodiments described herein provide useful physical machines and particularly configured computer hardware arrangements.

As can be understood, the examples described above and illustrated are intended to be exemplary only.

Applicant notes that the described embodiments and examples are illustrative and non-limiting. Practical implementation of the features may incorporate a combination of some or all of the aspects, and features described herein should not be taken as indications of future or existing product plans. Applicant partakes in both foundational and applied research, and in some cases, the features described are developed on an exploratory basis.

REFERENCES

Bengio, Y., Courville, A., and Vincent, P. Representation learning: A review and new perspectives. IEEE transactions on pattern analysis and machine intelligence, 350 (8):0 1798-1828, 2013.

Chen, T., Kornblith, S., Norouzi, M., and Hinton, G. A simple framework for contrastive learning of visual representations. arXiv preprint arXiv:2002.05709, 2020.

Choi, H., Jang, E., and Alemi, A. A. Waic, but why? generative ensembles for robust anomaly detection. arXiv preprint arXiv:1810.01392, 2018.

Daxberger, E. and Hernandez-Lobato, J. M. Bayesian variational autoencoders for unsupervised out-of-distribution detection. arXiv preprint arXiv:1912.05651, 2019.

Dietterich, T. and Gilmer, J. Uncertainty & robustness in deep learning, 2019.

Dinh, L., Sohl-Dickstein, J., and Bengio, S. Density estimation using real nvp. arXiv preprint arXiv:1605.08803, 2016.

Dosovitskiy, A., Fischer, P., Springenberg, J. T., Riedmiller, M., and Brox, T. Discriminative unsupervised feature learning with exemplar convolutional neural networks. IEEE transactions on pattern analysis and machine intelligence, 380 (9):0 1734-1747, 2015.

Gidaris, S., Singh, P., and Komodakis, N. Unsupervised representation learning by predicting image rotations. arXiv preprint arXiv:1803.07728, 2018.

Goodfellow, I., Pouget-Abadie, J., Mirza, M., Xu, B., Warde-Farley, D., Ozair, S., Courville, A., and Bengio, Y. Generative adversarial nets. In Advances in neural information processing systems, pp. 2672-2680, 2014.

Hendrycks, D. and Gimpel, K. A baseline for detecting misclassified and out-of-distribution examples in neural networks. arXiv preprint arXiv:1610.02136, 2016.

Hendrycks, D., Mazeika, M., and Dietterich, T. Deep anomaly detection with outlier exposure. arXiv preprint arXiv:1812.04606, 2018.

Huang, G., Liu, Z., Van Der Maaten, L., and Weinberger, K. Q. Densely connected convolutional networks. In Proceedings of the IEEE conference on computer vision and pattern recognition, pp. 4700-4708, 2017.

Kingma, D. P. and Dhariwal, P. Glow: Generative flow with invertible 1×1 convolutions. In Advances in neural information processing systems, pp. 10215-10224, 2018.

Kingma, D. P. and Welling, M. Auto-encoding variational bayes. arXiv preprint arXiv:1312.6114, 2013.

Lee, K., Lee, K., Lee, H., and Shin, J. A simple unified framework for detecting out-of-distribution samples and adversarial attacks. In Advances in Neural Information Processing Systems, pp. 7167-7177, 2018.

Liang, S., Li, Y., and Srikant, R. Enhancing the reliability of out-of-distribution image detection in neural networks. arXiv preprint arXiv:1706.02690, 2017.

Ma, X., Li, B., Wang, Y., Erfani, S. M., Wijewickrema, S., Schoenebeck, G., Song, D., Houle, M. E., and Bailey, J. Characterizing adversarial subspaces using local intrinsic dimensionality. arXiv preprint arXiv:1801.02613, 2018.

Mohseni, S., Pitale, M., Yadawa, J., and Wang, Z. Self-supervised learning for generalizable out-of-distribution detection. 2020.

Nalisnick, E., Matsukawa, A., Teh, Y. W., Gorur, D., and Lakshminarayanan, B. Do deep generative models know what they don't know? arXiv preprint arXiv:1810.09136, 2018.

Nalisnick, E., Matsukawa, A., Teh, Y. W., and Lakshminarayanan, B. Detecting out-of-distribution inputs to deep generative models using typicality. arXiv preprint arXiv:1906.02994, 2019.

Noroozi, M. and Favaro, P. Unsupervised learning of visual representations by solving jigsaw puzzles. In European Conference on Computer Vision, pp. 69-84. Springer, 2016.

Papamakarios, G., Nalisnick, E., Rezende, D. J., Mohamed, S., and Lakshminarayanan, B. Normalizing flows for probabilistic modeling and inference. arXiv preprint arXiv:1912.02762, 2019.

Ren, J., Liu, P. J., Fertig, E., Snoek, J., Poplin, R., Depristo, M., Dillon, J., and Lakshminarayanan, B. Likelihood ratios for out-of-distribution detection. In Advances in Neural Information Processing Systems, pp. 14707-14718, 2019.

Rezende, D. J. and Mohamed, S. Variational inference with normalizing flows. arXiv preprint arXiv:1505.05770, 2015.

Tolstikhin, I., Bousquet, O., Gelly, S., and Schoelkopf, B. Wasserstein auto-encoders. arXiv preprint arXiv:1711.01558, 2017.

Tschannen, M., Bachem, O., and Lucic, M. Recent advances in autoencoder-based representation learning. arXiv preprint arXiv:1812.05069, 2018.

Vernekar, S., Gaurav, A., Denouden, T., Phan, B., Abdelzad, V., Salay, R., and Czarnecki, K. Analysis of confident-classifiers for out-of-distribution detection. arXiv preprint arXiv:1904.12220, 2019.

Vincent, P., Larochelle, H., Bengio, Y., and Manzagol, P.-A. Extracting and composing robust features with denoising autoencoders. In Proceedings of the 25th international conference on Machine learning, pp. 1096-1103, 2008.

Zhang, R., Isola, P., and Efros, A. A. Colorful image colorization. In European conference on computer vision, pp. 649-666. Springer, 2016.

Zhang, R., Isola, P., and Efros, A. A. Split-brain autoencoders: Unsupervised learning by cross-channel prediction. In Proceedings of the IEEE Conference on Computer Vision and Pattern Recognition, pp. 1058-1067, 2017.

What is claimed is:

1. A system of machine learning architecture for out-of-distribution data set detection comprising:

a processor;

a memory coupled to the processor and storing processor-executable instructions that, when executed, configure the processor to:

receive an input data set;

determine, via an auto-encoder, a semantic meaning of the input data set;

generate, via the auto-encoder, an out-of-distribution prediction based at least on the semantic meaning of the input data set and scoring operations, wherein the scoring operations include an outer loop of geometric transformations to minimize falsely predicted in-distribution observations or are based on:

an error value associated with a predicted reconstruction of transformed one or more training data sets and a partition operation; or a linear classifier trained by learned latent representation of in-distribution and out-of-distribution data sets, the auto-encoder trained to encode a semantic meaning of in-distribution data within one or more training data sets by performing a pretext task, the pretext task including:

applying a transformation function to the one or more training data sets;

encoding the transformed one or more training data sets into a latent representation; and reconstructing the latent representation of the transformed one or more training data sets, the trained auto-encoder trained for reducing a reconstruction error between the one or more training data sets and the reconstructed transformed one or more training data sets thereby learning to encode the semantic meaning of the in-distribution data of the one or more training data sets; and generate a signal for providing an indication of whether the input data set is an out-of-distribution data set.

2. The system of claim 1, wherein the processor-executable instructions, when executed, configure the processor to:

identify one or more data values of the input data set as being out-of-distribution by a threshold amount;

generate an updated training data set including the identified one or more out-of-distribution data values; and providing the training data set for training the auto-encoder based on the updated training data set.

3. The system of claim 1, the transformation function includes a set of transformations:

$$\Phi(\cdot) = \{\phi_k(\cdot) | k \in \{1 \ldots K\}\}$$

configured to transform a training data set into an alternate data set representation while preserving the semantic meaning for encoding.

4. The system of claim 3, wherein the set of transformations includes at least one of rotation transformation, segmentation transformation, image data warping operations, or chromatic aberration transformations of a spatial data set.

5. The system of claim 1, wherein the auto-encoder is trained based on a Gram matrix of the training data set, the Gram matrix associated with a base pooling operation for identifying structural correlations among data values of the training data set, the base pooling operation to reduce data set dimensions.

6. The system of claim 1, wherein the auto-encoder includes a decoder network having removed fully-connected layers for minimizing expressive properties of the decoder network to provide a regularized asymmetric auto-encoder.

7. The system of claim 6, wherein the auto-encoder includes an encoder network based on a DenseNet architecture.

8. The system of claim 1, wherein the scoring operations are defined by:

$$\mathcal{S}(x_i) = 1 - \frac{\|x_i - \hat{x}_i\|^2}{\sum_{k'}^{K} \|x_i - \phi_{k'}(\hat{x}_i)\|^2},$$

where $\hat{x}_i = f_\vartheta(f_\theta(x))$ denotes the predicted reconstruction, $x_i$ is an observed data value, and $\phi_k$ represents at least one transformation function.

9. The system of claim 1, wherein the scoring operations are defined by:

$$\mathcal{S}(x_i) = \frac{1}{K}\sum_k^K \left[1 - \frac{\|\phi_k(x_i), \phi_k(\hat{x}_i)\|^2}{\sum_{k'}^{K} \|\phi_k(x_i), \phi_{k'}(\hat{x}_i)\|^2}\right],$$

where $\hat{x}_i = f_\vartheta(f_\theta(x))$ denotes the predicted reconstruction, $x_i$ is an observed data value, and $\phi_k$ represents at least one transformation function.

10. The system of claim 1, wherein the scoring operations are defined by the scoring function:

$$s_i = \sigma(w^T \tilde{z}_i + b)$$

where (w, b) denotes coefficients of linear classifier and $$\tilde{z}_i = f_\theta(\phi_1(x_i)) \| f_\theta(\phi_2(x_i)) \| \ldots \| f_\theta(\phi_K(x_i))$$

denotes concatenation of latent representations projected from semantic invariant transformations.

11. The system of claim 1, wherein the auto-encoder is based on a Wasserstein Auto-encoder for out-of-distribution detection.

12. A method of machine learning architecture for out-of-distribution data set detection comprising:

receiving an input data set;

determining, via an auto-encoder, a semantic meaning of the input data set;

generating, via the auto-encoder, an out-of-distribution prediction based at least on the semantic meaning of the input data set and scoring operations, wherein the scoring operations include an outer loop of geometric transformations to minimize falsely predicted in-distribution observations or are based on:

an error value associated with a predicted reconstruction of transformed one or more training data sets and a partition operation; or a linear classifier trained by learned latent representation of in-distribution and out-of-distribution data sets, the auto-encoder trained to encode a semantic meaning of in-distribution data within one or more training data sets by performing a pretext task, the pretext task including:

applying a transformation function to the one or more training data sets;

encoding the transformed one or more training data sets into a latent representation; and reconstructing the latent representation of the transformed one or more training data sets, the trained auto-encoder trained for reducing a reconstruction error between the one or more training data sets and the reconstructed transformed one or more training data sets thereby learning to encode the semantic meaning of the in-distribution data of the one or more training data sets; and generating a signal for providing an indication of whether the input data set is an out-of-distribution data set.

13. The method of claim 12, comprising:

identifying one or more data values of the input data set as being out-of-distribution by a threshold amount;

generating an updated training data set including the identified one or more out-of-distribution data values; and providing the training data set for training the auto-encoder based on the updated training data set.

14. The method of claim 12, wherein the transformation function includes at least one of rotation transformation, segmentation transformation, image data warping operations, or chromatic aberration transformations of a spatial data set.

15. The method of claim 12, wherein the auto-encoder model is trained based on a Gram matrix of the training data set, the Gram matrix associated with a base pooling operation for identifying structural correlations among data values of the training data set, the base pooling operation to reduce data set dimensions.

16. The method of claim 12, wherein the auto-encoder includes a decoder network having removed fully-connected layers for minimizing expressive properties of the decoder network to provide a regularized asymmetric auto-encoder.

17. The method of claim 12, wherein the scoring operations are defined by:

$$\mathcal{S}(x_i) = \frac{1}{K}\sum_{k}^{K}\left[1 - \frac{\|\phi_k(x_i), \phi_k(\hat{x}_i)\|^2}{\sum_{k'}^{K}\|\phi_k(x_i), \phi_{k'}(\hat{x}_i)\|^2}\right],$$

where $\hat{x}_i = f_\vartheta(f_\theta(x))$ denotes the predicted reconstruction, $x_i$ is an observed data value, and $\phi_k$ represents at least one transformation.

18. A non-transitory computer-readable medium having stored thereon machine interpretable instructions or data representing an auto-encoder trained to encode a semantic meaning of in-distribution data within one or more training data sets by performing a pretext task, the pretext task including applying a transformation function to the one or more training data sets, encoding the transformed one or more training data sets into a latent representation, and reconstructing the latent representation of the transformed one or more training data sets, the trained auto-encoder trained for reducing a reconstruction error between the one or more training data sets and the reconstructed transformed one or more training data sets thereby learning to encode the semantic meaning of the in-distribution data of the one or more training data sets, the machine interpretable instructions or data which, when executed by a processor, cause the processor to perform a computer implemented method comprising:

receiving an input data set;

determining, via the auto-encoder, a semantic meaning of the input data set;

generating via the auto-encoder, an out-of-distribution prediction based at least on the semantic meaning of the input data set and scoring operations, wherein the scoring operations include an outer loop of geometric transformations to minimize falsely predicted in-distribution observations or are based on:

an error value associated with a predicted reconstruction of transformed one or more training data sets and a partition operation; or a linear classifier trained by learned latent representation of in-distribution and out-of-distribution data sets; and generating a signal for providing an indication of whether the input data set is an out-of-distribution data set.

* * * * *